(12) United States Patent
Kawamura et al.

(10) Patent No.: US 6,477,563 B1
(45) Date of Patent: Nov. 5, 2002

(54) AGENT SYSTEM AND INFORMATION PROCESSING METHOD FOR SAME

(75) Inventors: Takahiro Kawamura, Tokyo (JP); Yasuyuki Tahara, Yokohama (JP); Yutaka Irie, Yokohama (JP); Naoki Kase, Yokohama (JP); Tetsuo Hasegawa, Tokyo (JP); Akihiko Ohsuga, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/289,598

(22) Filed: Apr. 12, 1999

(30) Foreign Application Priority Data

Apr. 13, 1998 (JP) .......................................... 10-101549
Jul. 10, 1998 (JP) .......................................... 10-196274

(51) Int. Cl.$^7$ ............................................. G06F 15/16
(52) U.S. Cl. ....................... 709/202; 709/200; 709/201; 709/203; 709/205; 709/238; 709/317
(58) Field of Search ................................ 709/202, 203, 709/217, 201, 205, 317, 238

(56) References Cited

U.S. PATENT DOCUMENTS 5,887,171 A  *  3/1999  Tada et al.
6,016,393 A  *  1/2000  White et al.
6,049,819 A  *  4/2000  Buckle et al.
6,055,562 A  *  4/2000  Devarakonda et al.
6,085,222 A  *  7/2000  Fujino et al.
6,134,580 A  * 10/2000  Tahara et al.
6,237,045 B1 *  5/2001  Enomoto
6,338,081 B1 *  1/2002  Furusawa et al.

FOREIGN PATENT DOCUMENTS

JP   7-182174   7/1995
JP  10-149287   6/1998

OTHER PUBLICATIONS

Genesereth, M.R. and Ketchpel, S.P., "Software Agents", Special Issue on Intelligent Agents, Communication of the ACM vol. 37, No. 7, pp. 48–53, Jul., 1994.

Etzioni, Oren and Weld, Daniel, Department of Computer Science and Engineering University of Washington, Seattle, WA, "A Softbot–Based Interface to the Internet", Communication of the ACM, Jul., 1994.

* cited by examiner

Primary Examiner—Ayaz Sheikh
Assistant Examiner—Oanh Duong
(74) Attorney, Agent, or Firm—Banner & Witcoff, LTD.

(57) ABSTRACT

A system smoothly performing information processing is realized by dynamically making a decision, when it becomes necessary for an agent currently located at a platform to make use of another platform, with regard to whether to cause the agent to move to the other platform or cause the agent to cooperate with another agent that exists at the other platform. The dynamic decision is made in response to situations, resulting in enabling the unified utilization of mobile and stationary agents. The decision of using either movement or cooperation is typically made based on platform information and agent information. Even if planning changes the plan of an agent and regardless of what agent is using which platform's resources, it is possible to easily establish whether movement or cooperation is to be used, based on the platform profile and agent attributes. Such a system can perform information processing in response to changing situations.

19 Claims, 25 Drawing Sheets

| PLATFORM (NODE) | MOBILE AGENT SUPPORT |
|---|---|
| PORTABLE COMPUTER | ○ YES |
| TRAVEL AGENT | ○ YES |
| AIRLINE 1 | NO |
| AIRLINE 2 | NO |
| TOURIST BUREAU | ○ YES |
| REGIONAL UNIVERSITY | ○ YES |

| AGENT NAME | MEMBERSHIP | AGENT ATTRIBUTE (MOBILITY) |
|---|---|---|
| user | PORTABLE COMPUTER | ○ MOBILE |
| airline1_ag1 | AIRLINE 1 | STATIONARY |
| airline2_ag1 | AIRLINE 2 | STATIONARY |
| ⋮ | ⋮ | ⋮ |

FIG. 8

| EXCEPTION TYPE | EXCEPTION HANDLING |
|---|---|
| COMMUNICATION TIME-OUT (HIGH-RELIABILITY COMMUNICATION CIRCUIT) | SEARCH FOR ANOTHER MOVEMENT DESTINATION OR LOCATION TO COOPERATE; NOTIFY USER OF ERROR |
| COMMUNICATION TIME-OUT (LOW-RELIABILITY COMMUNICATION CIRCUIT) | ENTRY AFTER A WAIT TIME (REPEAT 5 TIMES) |
| ERRONEOUS SPECIFICATION OF MOVEMENT DESTINATION | ACCESS NAME SERVER; CORRECT KNOWLEDGE |
| NO MOBILE SUPPORT | CORRECT PLATFORM PROFILE; START COOPERATION OPERATION |
| INSUFFICIENT RESOURCES AT MOVEMENT DESTINATION | SEARCH FOR ANOTHER MOVEMENT DESTINATION OR LOCATION TO COOPERATE; IF NONE EXISTS, RETRY AFTER A WAIT TIME (REPEAT 3 TIMES) |

FIG. 9

| COMMUNICATION CIRCUIT | CONNECTED LOCATION 1 | CONNECTED LOCATION 2 | RELIABILITY |
|---|---|---|---|
| C1 | PORTABLE COMPUTER | TRAVEL AGENT | LOW |
| C2 | TRAVEL AGENT | AIRLINE 1 | ○ HIGH |
| C3 | TRAVEL AGENT | AIRLINE 2 | ○ HIGH |
| C4 | TRAVEL AGENT | TOURIST BUREAU | LOW |
| C5 | TOURIST BUREAU | REGIONAL UNIVERSITY | LOW |

FIG. 13
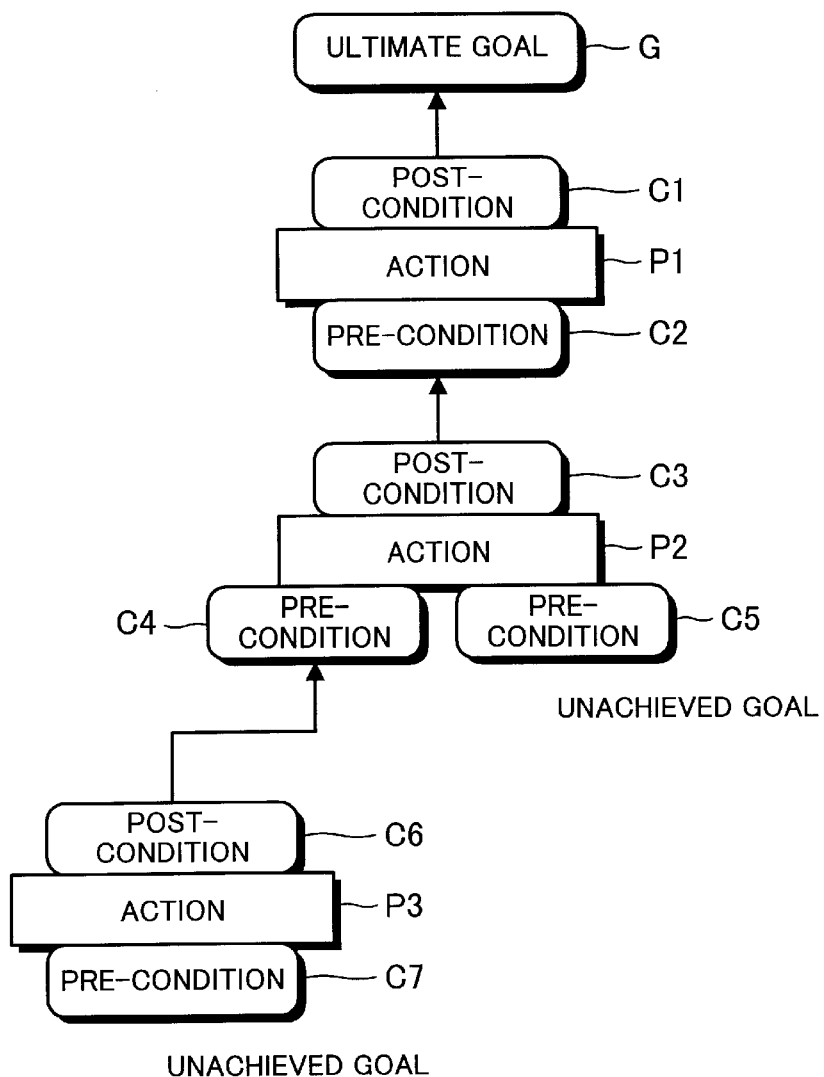
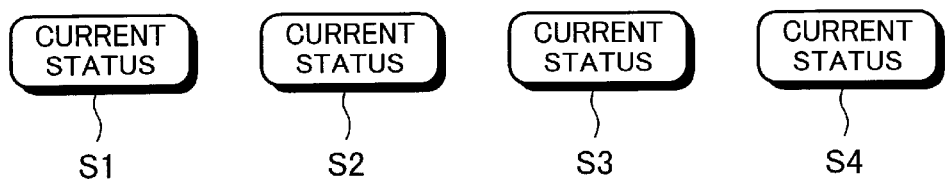

FIG. 24

PLATFORM PROFILE

| ITEM | MEANING |
| --- | --- |
| PLATFORM NAME | UNIQUE IDENTIFIER IN THE NETWORK |
| MOVEMENT SUPPORT | WHETHER OR NOT MOBILITY IS SUPPORTED |
| RELIABILITY | WHETHER THE RELIABILITY OF A NETWORK CIRCUIT IS HIGH OR LOW |
| PERSISTENCE | WHETHER IT IS POSSIBLE TO CAUSE AN AGENT TO EXIST INDEFINITELY |
| OWNER | OWNER (ADMINISTRATOR) OF THE PLATFORM |
| PERMISSION LIST | OPERATIONS THAT ARE PERMITTED TO AN AGENT |
| PLATFORM LANGUAGE LIST | LANGUAGES AND VERSIONS THEREOF THAT ARE EXECUTABLE |
| PROTOCOL | TYPE OF PROTOCOL SUPPORTED BY THE PLATFORM |
| AGENT MOVEMENT MANAGEMENT | WHETHER THE PLATFORM MAINLY MANAGES AGENT MOVEMENT |
| PROVIDED RESOURCE LIST | TYPES AND AMOUNTS OF RESOURCES THAT CAN BE PROVIDED |
| AGENT LIST | AGENTS EXISTING AT THE PLATFORM |
| PROVIDED SERVICE LIST | TYPE OF SERVICES THAT CAN BE PROVIDED |
| PLATFORM SCHEDULE | PERIOD OF TIME FOR WHICH THE PLATFORM ACTS |

FIG. 25

AGENT PROFILE

| ITEM | MEANING |
|---|---|
| AGENT NAME | UNIQUE IDENTIFIER IN THE NETWORK |
| MOBILITY POSSIBILITY | WHETHER OR NOT MOVEMENT BETWEEN PLATFORMS IS POSSIBLE |
| AGENT MOVEMENT MANAGEMENT | WHETHER THE AGENT MAINLY MANAGES AGENT MOVEMENT |
| REQUIRED RESOURCE LIST | TYPES AND AMOUNTS OF RESOURCES REQUIRED |
| AGENT SCHEDULE | PERIOD OF TIME FOR WHICH THE AGENT ACTS |
| AGENT LANGUAGE LIST | LANGUAGES AND VERSIONS THEREOF IN WHICH THE AGENT IS DESCRIBED |
| PROTOCOL | TYPE OF PROTOCOL SUPPORTED BY THE AGENT |
| REQUIRED SERVICE LIST | TYPE OF SERVICES REQUIRED |

AGENT SYSTEM AND INFORMATION PROCESSING METHOD FOR SAME

BACKGROUND OF THE INVENTION

1. Field of the Invention

The present invention relates to an improvement in technology for processing information existing in a distributed manner in a network, and more particularly to an improvement in agent-oriented information processing technology that adapts to a change in situations.

2. Description of the Related Art

In recent years, information processing systems such as computers have seen progressive downsizing and advances in the development of network environments, such as the Internet. For this reason, the information processing equipment and methods are largely experiencing a shift to a distributed system in which elements such as data files and function libraries are distributed among nodes in a network. Along with the change, there have been further advancements in providing an open network environment, with local networks of companies and research laboratories, for example, being connected to wide area networks, such networks connected to wide area networks being known as open networks.

In a typical large-scale open network, data files or function libraries that are distributed among a plurality of nodes are often combined to form a single piece of software, this class of software being known as a distributed system. It can be envisioned that such distributed constituent elements can be moved to another node or directory or can be subjected to a change in name or access authority in response to node management or network management situations. In making such changes, however, the following problems arise.

First, when a request is made for software processing, the request is input as a request description such as a message or command. When making this input, specific constituent elements with regard to processing located at a given node are specified. However, when the specified constituent elements are moved to another node, to specify the new destination node, it is necessary to either reenter or correct the input to the software. In particular when part of the software is configured to access a transferred constituent element, the movement of the constituent element changes the configuration of the software itself. In this case, it is necessary to change the accessing software part so as to specify the new destination node.

In the past, because elements such as nodes, functions, and files were named explicitly, when such functions and files were moved, the software or input needed to be changed accordingly. Furthermore, this type of specification needed to be made before the start of processing.

In distributed systems, therefore, in order to configure software to provide flexible response to reliably provide service to users, it is very important to be able to respond flexibly to such changes. In particular in the change of such changes, it is desirable to be able to change a specification even after processing has started and, if at all possible, automatically, without the need for human intervention.

In a network, recent years have seen attention being focused on agent-oriented technologies as a means for implementing such as flexible software architecture. This agent-oriented technology is a software-development technology which aims to make up a piece of software by treating agents as units, an agent being a unit of processing in software, the goal being to achieve autonomous and flexible response to environmental changes. Agents can be classified as mobile agents, which are capable of being moved between nodes that made up a network, and stationary agents, which do not possess such mobility.

An agent system is a system in which an agent performs information processing with the goal of satisfying requests from a user. If a single system uses a plurality of agents, it is possible to perform highly efficient information processing in a distributed system such as a distributed processing network. Such system as to use a plurality of agents is known as a multi-agent system.

The term "node" refers to a logical unit that makes up a network, and if an agent is considered to be a program, a node serves the function of an interpreter or operating system that supports the operation of the agent. This type of node is known as a platform, which can exist as a single computer, and there are cases in which a plurality of nodes exists in one computer.

For example, in the Japanese Unexamined Patent Application publication H7-182174, there is disclosed a method of implementing remote programming. This remote programming is such programming as to transfer an agent from the node at which processing was begun to another node in a distributed system.

Agent System Example

Next, an example of an agent system that uses the above-noted agent to implement remote programming will be described. Specifically, FIG. 28 is a functional block diagram that shows an example of a multi-agent system which uses a mobile agent. The agent system that is shown in this drawing has a network 800N that connects a plurality of nodes 800 and, while a large number of nodes 800 can be provided in the system, two representative nodes are shown in FIG. 28. Of the nodes 800, the node that is used by the user in creating an agent will be called the local node (800L) and the node that is the destination for the generated agent will be called the remote node (800R). The local node 800L and the remote node 800R have mutually similar configurations, and the agents are treated as processes. The term "process" as used herein refers to a unit of processing that is managed by an operating system, and the simultaneous management of a plurality of processes is known as multi-process management.

In the above-noted multi-agent system, each node 800 has an input/output means 803 (L, R) for the purpose of the user generating an agent and for receiving the results of information processing that is performed by an agent. An agent management means 804 (L, R) of each node, in addition to being used for generating and deleting an agent, is used to move an agent to another node by transferring information of the agent to the other node, and in the same manner to receive an agent from another node.

If a user wishes to perform some type of information processing using the above-described type of agent system, the user creates an agent at the local node 800L by giving an indication from the input/output means 803L to the agent management means 804L.

Then, in the most basic case, the user issues a script from the input/output means 803L to a generated agent. The script is an action program for an agent, and is described with specific contents that indicate, for example, of which node is to be moved to and what processing is to be performed. As a more specific example of a script, it can be envisioned that movement is to be made to node A, and a copy of file a is to be sent to a user node, after which movement is made to node b, and a copy of file b is sent to a user node. An interpretation/execution means 802 (L, R) that is provided at each node executes such a script so as to apply the agent, thereby achieving the desired object of information processing.

In the above-noted case, an agent information storage means 801 (L, R) at each node stores information required for the agent. In addition to the above-noted script, the information required for the agent includes, for example, the variables necessary for interpretation and execution of the script (these being known as script variables) and, if required, information or files collected by the agent. As instructions described into a script for an agent, in addition to instructions that can be executed at only a single node, there are movement instructions which cause movement of an agent from one node to another. The interpretation/execution means 802L sequentially executes instructions of the script and, if it is necessary to execute a movement instruction, it specifies the destination node and issues a request to the agent management means 804 to move the agent. In this case, the agent management means 804L would perform the following processing to transfer the agent.

Specifically, the agent management means 804L issues a request via the network 800N to the agent management means 804R at the remote node 800R to prepare to accept the agent. When this is done, the agent management means 804R that receives this request performs preparation for accepting the agent, such as assignment of resources and making settings of processes that perform agent management, after which it issues a notification to the agent management means 804L at the local node 800L that these preparations have been completed.

Upon receiving the above-noted notification, the agent management means 804L reads and agent information such as the script and the internal agent status at the time of interpretation and execution of the above-noted movement instructions from the agent information storage means 801L, and transfers this agent information to the remote node 800R. The agent management means 804R of the remote node 800R first stores the transferred agent information in the agent information storage means 801R, and then notifies the interpretation execution means 802R of having done so, whereupon interpretation and execution begins.

When the agent transfer is successfully completed in the above-noted manner, the agent management means 804L at the local node 800L ends the process, and releases now-unnecessary resources such as memory and CPU time.

At the remote node 800R to which the agent was transferred, processing proceeds, using the agent information within the agent information storage means 801R. There are cases in which the processing results in completion at the remote node 800R, and cases in which the agent is transferred back to the local node 800L. If the agent is transferred once again in this manner, the script execution will be executed again at the local node 800L. The above-noted remote programming enables flexible processing in a distributed system.

In the above-noted type of remote programming, even if the node configurations differ, if the interpretation/execution means and agent management means and the like are configured to suit the node-specific hardware and operating system while using agent information that is common among the nodes, compatibility can be achieved even among nodes that have different configurations. By adopting this type of configuration, it is possible to transfer and execute scripts to perform the above-noted flexible processing, even among computer systems that have different operating systems and hardware.

For example, in an agent system such as described above, if a user wishes to collect a number of files from the network, an action program (script) to achieve this object can be given to an agent and the agent sent out to the network. The agent that is sent out to the network acts autonomously according to the script that it has been given. For this reason, because there is no need to maintain continuous communications between the user node and the agent, compared with such network functions of the past as ftp and telnet, there is the advantage of immunity to circuit faults.

There is another known prior art for the purpose of performing processing which bridges across a plurality of nodes in a network, this being described in Oren Etzioni and Daniel Weld "A Softbot-Based Interface to the Internet", in *Communications of ACM*. In this technology such previously available network functions as ftp, which is used to perform file transfer, and telnet, which implements a virtual terminal function for the purpose of performing a remote login are used to perform processing that bridges across a plurality of nodes. Software performs trial-and-error use of functions automatically, based on information that is collected during operation, flexible planning being performed in response to situations, so as to select functions in accordance with changes in configuration, such as with regard to files.

For example, if a desired function is transferred to another node, since an attempt to access the function at the node before transfer would fail, planning is performed at the original node, so as to change the access destination to the second candidate for re-access. According to this technology, it is possible to achieve flexible operation in response to status at various points in time. In this technology, the use of functions such as telnet and ftp is done within a range for which compatibility has been ascertained.

When an agent is operating at a particular node, it often must make use of resources such as files and software that are characteristic of other nodes. In such cases, a stationary agent, which does not have mobility, will cooperate with an agent that exists at another node, making use of contracted network protocols or other procedures. In contrast to this, in the case of a mobile agent, not only will it cooperate, because it can also move to another node to make use of the resources at the other node, it can make use of either cooperation or movement.

If for example, because of the need as noted above to use resources of another node, it is necessary to make use of another node, a mobile agent must be able to either cooperate or move. In the method of the past, in which a script was described beforehand as an action program for a mobile agent, in a case in which either cooperation or movement is required, which is actually performed must be established beforehand as an operational sequence. For this reason, whether cooperation or movement is desirable will differ, depending upon a variety of conditions, such as the reliability and bandwidth of the circuit that connects the nodes, and the node characteristics.

For example, in a case in which an agent will attempt to make use of a resource at another node to which the node where the agent exists is connected by a circuit having low reliability or low bandwidth, movement is more desirable than cooperation. That is, in the case of cooperation, although there is a need to maintain communication between the nodes, over a circuit having poor reliability or low bandwidth, there is a tendency for communications to be broken off, in which case the cooperative processing is interrupted. In contrast to the case of cooperation, if the agent itself moves to the other node, even if the circuit via which the movement was done is broken, there is no problem created at the destination node of the movement, thereby enabling processing to continue. In this case, when the processing is completed, the agent may return to the original node when the circuit status is restored.

Even if an agent at a node is a mobile agent that has a function of mobility, unless another node at which the resource is to be used supports mobile agents, that agent will be forced to cooperate with another agent of the other node. That is, unless the other node has a means for receiving the agent information and causing the agent to act, even if it is possible to transfer the agent to that node, it will not be possible for the mobile agent to continue processing.

Therefore, at the point at which the action program for a mobile agent is described, for each case in which either movement or cooperation is required, it is desirable that various conditions that affect which is desirable be understood and the appropriate selection of movement or cooperation be made. It is difficult, however, to gain a grasp of such various conditions beforehand and, even if it were possible to do understand such various conditions beforehand, there are cases in which a condition changes during the operation of a mobile agent, after the script for the mobile agent is established. For example, as described above, when constituent elements such as distributed files or libraries are to be moved among nodes, the node at which the resource to be used exists itself changes. For this reason, at the point at which the action program for the mobile agent is described, it becomes difficult to establish whether movement or cooperation is the desired choice.

As is clear from the foregoing discussion, m a case in which a mobile agent is required to either move or cooperate, rather than establishing this choice as fixed, it is desirable to be able to establish this dynamically on-the-fly, according to the situations at the required time. However, as described above, in the prior art, in which the action program for a mobile agent was described as a script beforehand, it is necessary to establish beforehand whether movement or cooperation is to be performed, in terms of an operational sequence. In this type of method of the past, therefore, it is clearly difficult to establish whether movement or cooperation is to be done dynamically, in accordance with the situation. In particular, with open-type networks that are of large-scale, because the larger the scale of the network, the more often the software configuration changes, there is a great desire to be able to accommodate this type of change.

When a mobile agent is to be moved to another node, it is not possible for the user of the mobile agent to directly manage the destination node of the movement. For this reason, when some fault occurs at the destination node, it is difficult to take appropriate action with respect to this fault. Additionally, in a case as described above as well, in which communications are cut off because of the low reliability or low bandwidth of the circuit, it is difficult to take appropriate action with respect to such a fault.

That is, in operating a mobile agent, the following two points should be kept in mind. The first point is that it is often the case that one of the major reasons for using a mobile agent is the low reliability or low bandwidth of a communication circuit. For this reason, the major field of application for a mobile agent is that of mobile computing that makes use of a portable terminal. When using such circuits that have low reliability, a large problem is that of what type of action should be taken when exceptions such as errors occur.

The second point is that a mobile agent can be operated on a machine that is out of the management scope of the user. For this reason, when an exception situation occurs in the operation of an agent on such a machine, it is significantly more difficult to take action than it would be in the case if a mobile agent were not being used. In particular when a destination machine that is connected by a communication circuit of low reliability is used, such as noted with regard to point 1, this difficulty becomes prominent.

In addition to the above, in the prior art method of describing the action program for a mobile agent as a script beforehand, because it is necessary to describe all the operational examples of the agent, this operation itself becomes troublesome.

In the method of Etzioni et al, it is necessary to continue mutual access between the local machine and the remote machine and sending and receiving of data. For this reason, there is the problem that if the communication circuit develops a fault during processing that cuts off the access path, it is not possible to continue normal processing. In addition, there are cases in which it is necessary to make detailed access of information contents at a remote node and to change the type of processing performed, and to perform repeated access of information at a remote node, and cases which demand that processing be performed in real time to some degree, these cases making it more efficient to performing information processing as a process operating on the remote machine.

OBJECT OF THE INVENTION

Therefore, an object of the present invention is to provide an agent system that, when it is necessary for an agent to perform some task at another node, is capable of dynamically judging at that point, based on the situations at that time, whether to move the agent or have the agent cooperate. Given such an agent system, it is possible to perform highly efficient information processing that is responsive to changes in situation.

SUMMARY OF THE INVENTION

The above-described problems in the prior art are solved by an improvement in agent-oriented technology according to the present invention. In one aspect of the present invention, there is provided an agent system in which processing information is performed by causing an agent to act in a network that has a plurality of platforms. This agent system has a movement means for causing an agent to move between platforms, and a means for causing cooperation to be performed between a plurality of agents. This system further has a decision means for making a decision, when it becomes necessary for an agent currently located at a platform to make use of another platform for the illustrative purpose of utilizing resources of the other platform for the illustrative purpose of utilizing resources of the other node, with regard to whether to cause the agent to move to the other platform or cause the agent to cooperate with another agent that exists at the other platform.

In order to perform the above-noted type of judgment, the above-noted agent system uses some information that serves as a criterion for the judgment. Such information used as, a typical judgment criterion may include information stored in agent profile, such as agent attributes with regard to whether or not the individual agents have the ability to move between platforms. Such information used as the typical judgment criterion also may include information stored in platform profiles, which typically includes information with regard to whether individual platforms are capable of accepting and activating an agent. It is also possible to use information with regard to the reliability of the network circuits that connect the platforms. By storing at least these various types of information as a judgment criterion beforehand, it is easy to make the above noted judgment, based on this judgment criterion. It is also possible to send a test message for either movement or cooperation to the target platform, and then making a judgment based on whether or not a message is returned which satisfies conditions. It is also possible to make the judgment based on whether a file for movement or cooperation having a characteristic file name exists at the target platform.

As a result, even when there is a difference either in the mobility among agents, in the ability to support mobile agents among platforms, it is possible to perform processing with making use of another platform. Similarly, even when there is a difference in the reliability of circuits that connects platforms due to what platforms are combined, it is possible to perform processing with making use of another platform. For example, to move an agent to another platform, it is necessary that both the current platform and the destination platform support the movement and also necessary that the agent itself have mobility. When the reliability of the circuit that connects the platform at which the agent currently exists to another platform is low, since an attempt to perform cooperation could be envisioned as resulting in a possible cutoff of messages midway, movement of the agent would be the appropriate choice.

It is desirable that the above-noted agent system be configured so as to generate and execute an agent plan that satisfies the given requests. In order to create an action plan for an agent that is responsive to the situation and achieve processing with making use of another node, dynamic selection is made, based on conditions, of whether to cause movement between nodes or to cooperate with another agent. This enables highly efficient information processing that is responsive to changes in the network. Therefore, because it is possible to effectively utilize movement and cooperation of agents by planning in response to network changes, it is possible to perform effective information processing even in an open network.

It is desirable that the above-noted agent system be configured so that it responds to various exceptions when an agent attempts a move between platforms. Examples of exceptions that tend to occur when movement is done include a failed communication with the destination of the move, an invalid specification of the destination, the lack of support of the destination for the mobile agents, and an insufficiency in resources at the destination. The action to be taken in each of these cases is expressed as the exception description. Using this type of exception description, it is possible to effectively handle exceptions when they occur. With regard to a loss of communication because of a low reliability on the communication circuit, it is desirable that information with regard to the reliability of the communication circuit be prepared beforehand at the platform, for example, and to establish beforehand how the loss of communication is to be handled when it occurs on a circuit over which an attempt is made by an agent to move. By doing this, even if the reliability of the communication circuit is low, resulting in a tendency to communication being lost, there is achieved an immunity to impaired operations and failures or the like.

The above-noted agent system can be configured either so that the agent itself manages a procedure for movement to another platform, or so that the platform is the focus of the management. By selecting dynamically whether a series of processing procedures related to the movement is to be performed chiefly by the agent or chiefly by the platform, the degree of freedom with regard to how the agent moves is increased. This enables an improvement in the autonomy of the agent and the overall processing efficiency.

It is also possible for the above-noted agent system to be configured so as to select an appropriate movement timing, and to select an appropriate destination from a plurality of destination platform candidates. It is also possible when an agent moves sequentially to a plurality of platforms, to establish an optimum sequence of movement, responsive to conditions. These improvements enable an improvement in the system processing efficiency.

It is further possible for the above-noted agent system to be configured so that it issues an indication for movement between platforms in response to the status of each platform. Because it is possible to dynamically assign agents to each of the platforms in response to platform status, it is possible to improve the system processing efficiency.

BRIEF DESCRIPTION OF THE DRAWINGS

FIG. 8 is a drawing that shows an example of exception description in the first embodiment of the present invention.

FIG. 9 is a drawing that shows an example of information with regard to reliability of communication circuits in the first embodiment of the present invention.

FIG. 13 is a conceptual diagram that shows a plan being generated in the first embodiment of the present invention.

FIG. 24 is a functional block diagram that shows a specific example of the data format in the platform profile in the second embodiment of the present invention.

FIG. 25 is a function block diagram that shows a specific example of the data format in the agent profile in the second embodiment of the present invention.

DESCRIPTION OF THE PREFERRED EMBODIMENTS

Embodiments of the present invention are described below, with references made to relevant accompanying drawings. The present invention is generally implemented by a computer that has peripheral device and software that controls the computer, m which case the software is a combination of instructions that follow the description of the present invention in this document, parts of the invention that are from the prior art making use of prior art methods that were described in the foregoing section on background art. This software is not limited to program code, and includes data that is prepared for use at the time the program code is executed.

The software implements the effect of the present invention by using physical resources which may include a processing unit such as a CPU, a coprocessor, or a chip set, an input device such as a keyboard or a mouse, a storage device such as a memory or a hard disk drive, and output devices such as a display or a printer.

It should be noted that various configurations of specific software and hardware can be used to implement the present invention. For example, the software can be in various forms, such as a compiler, an interpreter, or an assembler and, it is possible to perform communication with the external by means of a removable storage medium such as a floppy disk, or a network connection unit. A storage medium such as a CD-ROM onto which is stored a program or software for implementing the present invention alone forms one aspect of the present invention. Additionally, part of the functions of the present invention can be implemented in a physical electronic circuit, such as an LSI device.

Because, as described above, there are various methods that can be envisioned for implementing this present invention using a computer, virtual circuit blocks that implement the individual functions of the present invention and the embodiments thereof will be used to describe the present invention and embodiments thereof below.

Example of a Configuration That Uses Planning

Figure 28:
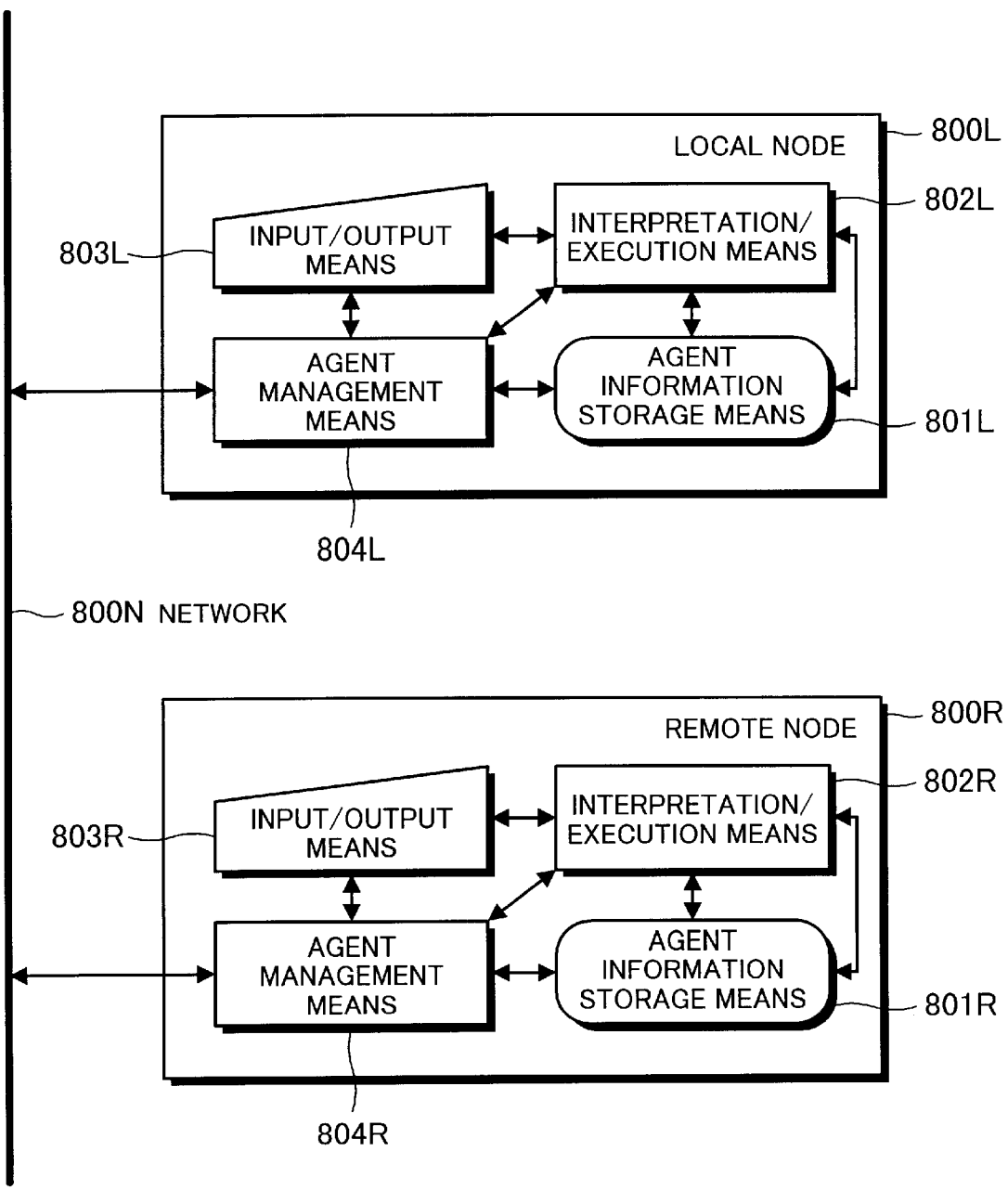
FIG. 28 is a block diagram that shows an example of an agent system of the past.

The inventors have continued research with regard to an agent system that is, in response to changing situations, capable of changing a script that serves as an action program for an agent, in contrast to the agent system of the past as shown in FIG. 28.

Specifically, in recent years, with networks of increased scale and complexity, and particularly with connections being made to open networks such as wide-area networks such as the Internet, changes in constituent elements of the network, such as the location of files, occur frequently. In an agent system such as shown in FIG. 28, however, because a fixed script is given to an agent at the time it is created, it is not possible to change the action of the agent in response to changing situations. Accordingly, the inventors proposed an agent system that has a planning function, as a technique for automatically changing the action of an agent without the need for human intervention, this being disclosed in the Japanese Unexamined Patent Application publication H9-176181.

In the above-noted technology, the agent action program is known as a plan, and the generation of this plan is known as planning. Using this technology, by re-generating a plan in response to a situation, accommodation is achieved with respect to changes in constituent elements of the network. When it is required to accommodate to changes in network configuration and the like, or when a plan execution has failed, the re-generation of a planning executed in the present invention is known as replanning.

Figure 1:
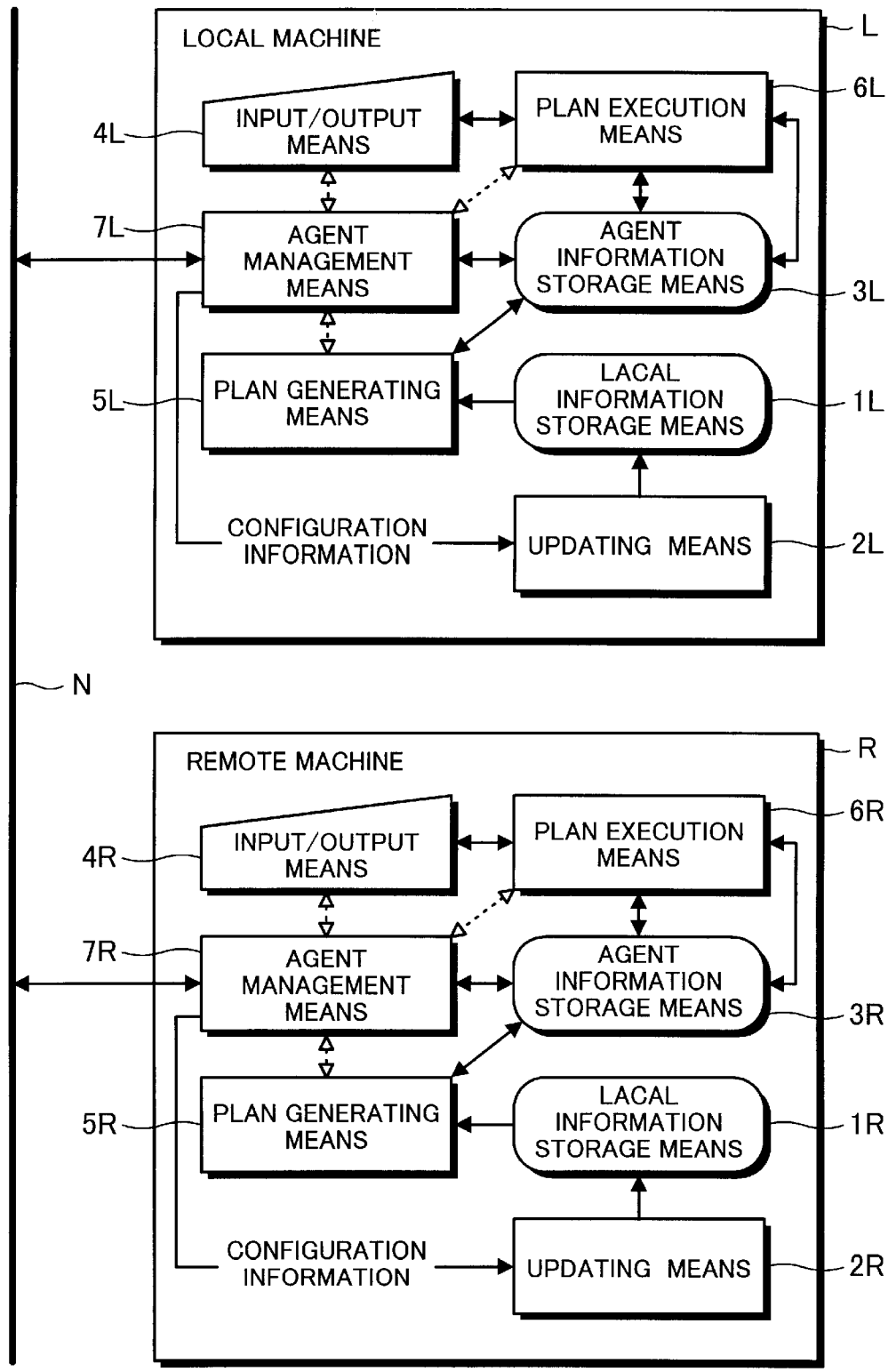
FIG. 1 is a block diagram that shows an example of an agent system that uses planning.

FIG. 1 shows the functional block diagram of an example of the configuration of such an agent system. In this technology, the information used in generating a plan are information known as "knowledge" and action definitions. Of these, "knowledge" includes a variety of information that is used in agent operation, and particularly in planning, one example of this being information with regard to constituent elements of the network, such as the node locations of files. For example, in the example shown in FIG. 1, knowledge with regard to this type of network is stored in a local information storage means 1L and, when there is a change in the network configuration, an updating means 2L is caused to reflect this change, by means of automatic detection or manual operations or the like. An action definition as noted above is a constituent part of a plan, and consists of information with regard to what types of instructions (actions) can be used, this being stored in an agent information storage means 3L.

In an agent system as noted above, a user which issues instructions to create an agent issues a goal to be achieved to a node, instead of issuing a script. This goal is a status that is to be achieved as the object of information processing, described in a preestablished grammar. A plan generating means 5L combines various actions included in the action definitions while referencing the given knowledge, thereby generating a plan for the purpose of achieving the goal. In such an agent system, because a change in the network configuration is reflected in an agent plan via knowledge at the time of planning or replanning, it is possible for an agent to flexibly accommodate itself to a change in situation, without human intervention.

Furthermore, a means for generating a plan such as this is called a "planner", and this is actually implemented as a type of program that represents the planning procedure. The broad concept of calling the agent action program and each of the parts thereof is the script, and the term "plan" is used to refer to the overall script that is generated by an agent that performs planning as shown in FIG. 1.

Example of an Action Using a Plan

Figure 2:
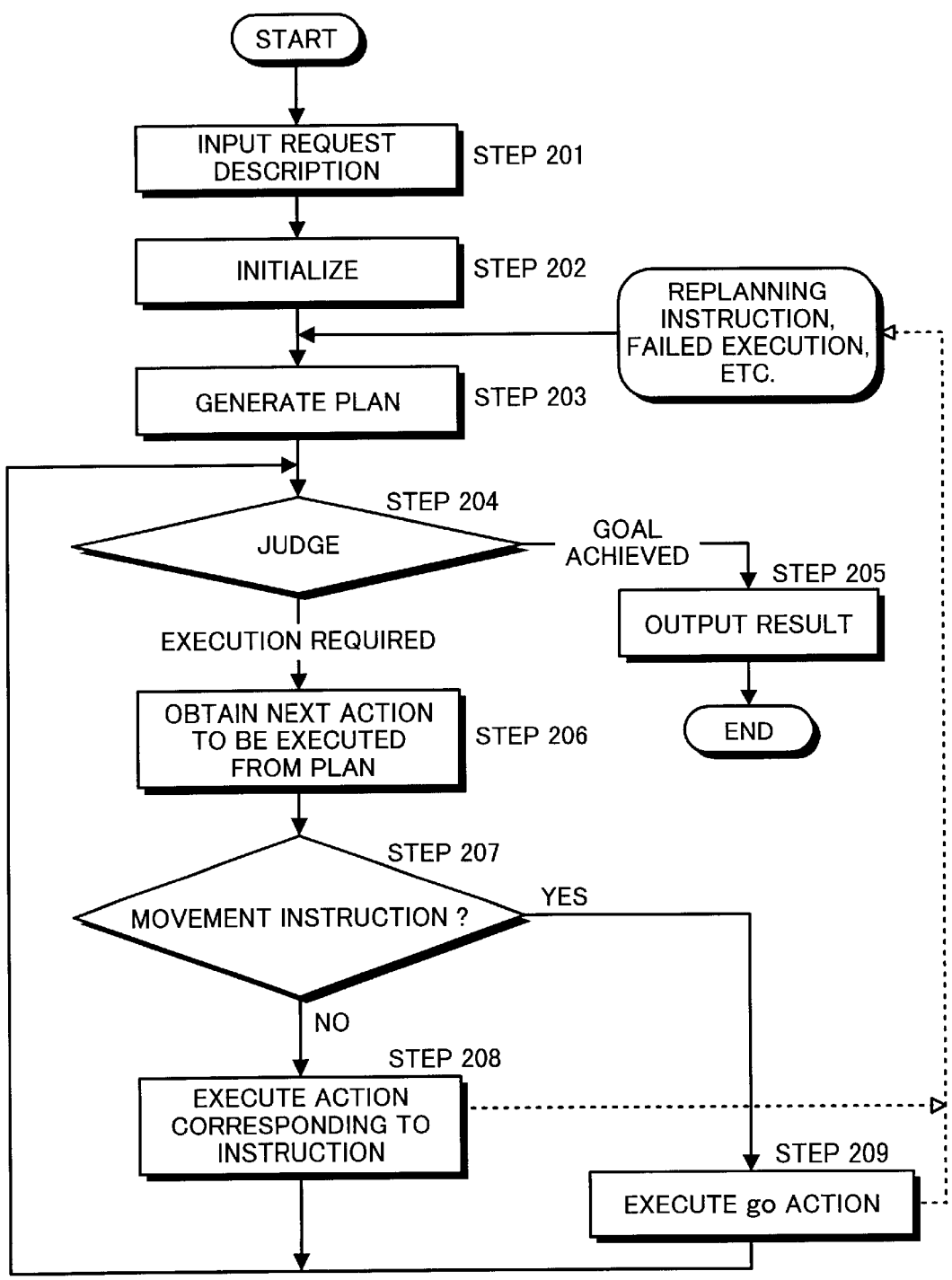
FIG. 2 is a flowchart that shows the processing procedure in an agent system that uses planning.

Next, a specific operating procedure for an agent system that uses planning such as described above will be described, using the example shown in FIG. 2. In this procedure, a user inputs the description (request description) for a request to the agent as an information processing goal (step 201), whereupon the required initialization is performed (step 202), after which a plan is generated (step 203). This processing is ended based on the results of a judge as to the ending conditions such as whether the goal has been achieved (steps 204 and 205).

Specifically, until these ending conditions are satisfied (step 204), the plan required to be executed to achieve the goal is executed. In the execution of the plan, instructions included in the plan are sequentially executed (steps 206 and 208) and, if a instruction to be executed is a movement instruction (step 207), processing to move an agent between nodes (referred to as a "go" action) is executed (step 209). If the execution of an instruction or a go action has failed, a new plan is generated, if necessary (step 203).

Agent life Cycle

Figure 3:
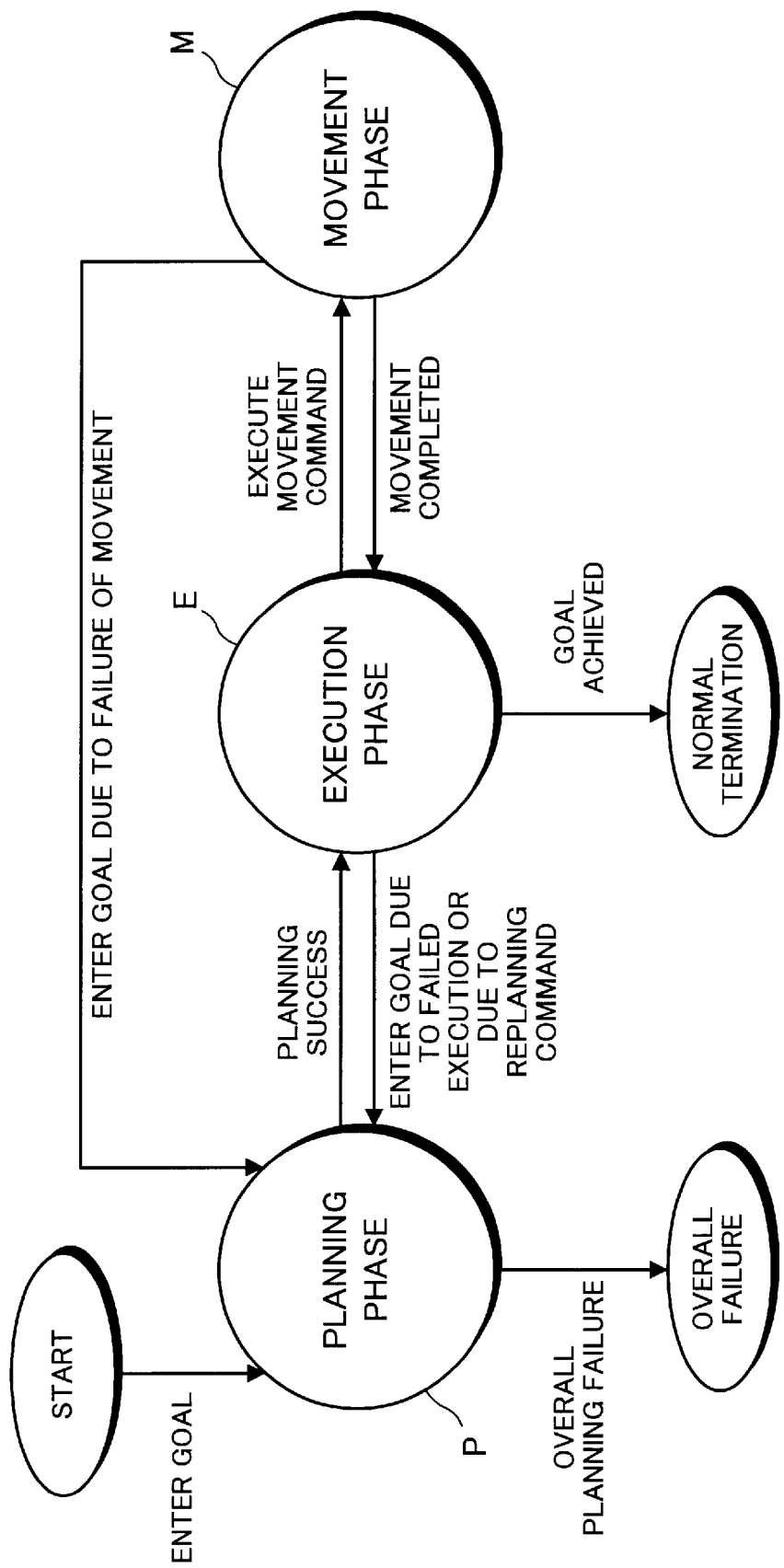
FIG. 3 is a conceptual diagram that shows the life cycle of an agent in an agent system that uses planning.

Next, the life cycle of an agent which performs the above-noted planning will be described, with reference being made to FIG. 3. Specifically, with the entry of the goal, an agent goes into action, this starting at the planning phase P According to the generated plan, the agent transfers from the planning phase P either to the execution phase E, in which the plan is executed, or to the movement phase M, in which movement between nodes is done. According to the generated plan, the agent acts while transferring among the phases in response to failure of execution or movement if it occurs. Once the initially given goal is achieved, normal termination is made. However, if the goal has not been achieved and the planning itself has failed, the termination is made as an overall failure.

1. First Embodiment

1. Configuration (1-1. Overall Platform Configuration)

Figure 4:
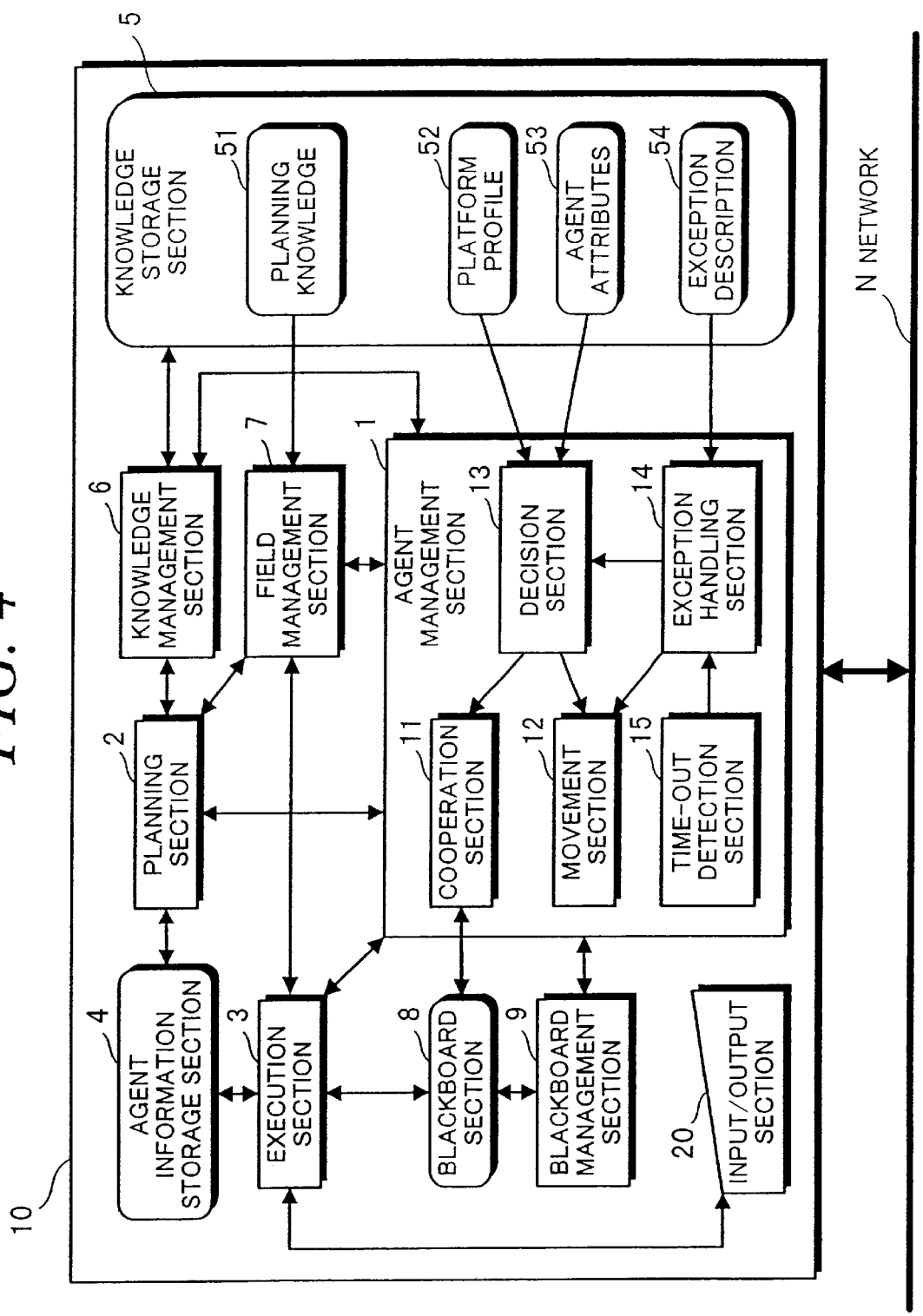
FIG. 4 is a functional block diagram that shows the configuration of the first configuration of the present invention.

This embodiment is an information processing apparatus in which an agent on a network formed by a plurality of mutually connected nodes performs processing of information. FIG. 4 is a block diagram that shows the configuration of one platform that makes up this embodiment.

In FIG. 4, the reference numeral 1 denotes an agent management section, which manages an agent. This agent management section 1 has a configuration (to be described later) that is required to implement planning, movement of an agent on network N, and cooperation between agents. The reference numeral 2 denotes a planning section, which generates a plan, this plan being the procedure that is to be executed by an agent for the purpose of satisfying a given request. The reference numeral 3 denotes an execution section that causes an agent to act by executing a plan that is generated in this manner. The reference numeral 4 denotes an agent information storage section, which stores information required for the agent to operate, this being, for example, the above-noted plan and variables that represent the internal status of the agent.

The reference numeral 5 denotes a knowledge storage section, which stores a variety of information (to be described later), such as knowledge required for planning and knowledge with regard to computers connected by a communication circuit having low reliability. The reference numeral 6 denotes a knowledge management section, which manages the knowledge storage section 5, this knowledge management section 6 performing processing for writing, reading, and correction of various knowledge that is stored in the knowledge storage section 5.

In the above-noted embodiment, each platform has a plurality of fields, these corresponding to different purposes. These fields indicate the scope of knowledge and agent operation. The reference numeral 7 denotes a field management section, which manages resources of the platform by allocating the resources to every field.

The reference numeral 8 denotes a blackboard section, which stores information that is used in controlling cooperation between agents and operation of an agent. The reference numeral 9 denotes a hierarchical blackboard management section, which manages a blackboard hierarchical architecture that represents the control level of the agent action in the blackboard section 8. The reference numeral 10 denotes a platform, which manages the various above-noted sections and which also manages communication on the network, and 20 is an input/output section which outputs information from various other sections, inputs information thereto, and which can input information that controls the status of each section.

(1-2. Specific Problem Example)

Figures 5, 6, 7:
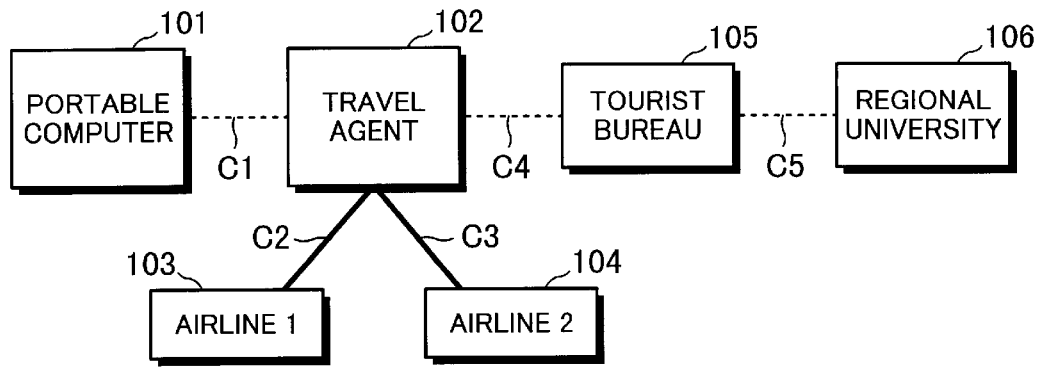
FIG. 5 is a conceptual diagram that shows an example of the problem in the first configuration of the present invention.
FIG. 6 is a drawing that shows an example of platform profiles in the first embodiment of the present invention.
FIG. 7 is a drawing that shows an example of agent attributes in the first embodiment of the present invention.

Next, FIG. 5 is a conceptual diagram that shows a specific example of an application of the above-noted embodiment to an actual problem. In this example, the problem is that travel ticket reservations are made at platforms 101 through 106, which are connected by the communication circuits Cl through C5. Specifically, in the example shown in FIG. 5, the reference numeral 101 denotes a portable computer that a user can carry around, this computer being capable of entering a network N in this embodiment by means of a cellular telephone or PHS telephone radio circuit, this circuit allowing connection and disconnection at any time. FIG. 4 shows an example of a platform that can be joined to the network.

By making use of the network via the above-noted portable computer 101, a user makes ticket reservations for modes of travel and a travel plan from Tokyo to a given university in a given region (which shall be called a "regional university").

In FIG. 5, the reference numeral 102 denotes a computer at a travel agent, this computer storing a variety of information with regard to computers that can be used for travel plan and travel ticket reservations on the network. The reference numerals 103 and 104 denote the computers of airline companies AL1 and AL2, respectively, 105 is a computer of a tourist bureau that covers the area in which the regional university is located, and 106 is a computer of the destination regional university.

Each of the computers 101 through 106 has stored in it information required for the travel plan and ticket reservations, to be described later. These computers 101 through 106 will hereinafter simply be referred to as the "travel agent", the "regional university", and the "tourist bureau".

(1-3. Contents of the Knowledge Storage Section)

Next, just what type of information is included in the knowledge storage section 5 of the platform 10 shown in FIG. 4 will be described. This knowledge storage section 5 is the section that stores knowledge required for plan generation, for movement of an agent between platforms, and for cooperation of agents, more specifically this knowledge storage section 5 stores planning knowledge 51, a platform profile 52, agent attributes 53, and exception description 54.

(1-3-1. Knowledge for Planning)

Of the above knowledge, the planing knowledge 51 is used in generating an agent plan, and this can include network configuration knowledge with regard to which files reside at which platforms, knowledge with regard to what type of planning is to be done in what cases, and various types of knowledge in accordance with the object of using the information processing system and the agent.

(1-3-2. Platform Profile)

The platform profile 52 is information with regard to whether each of the platforms can accept a transferred agent and support the operation of the agent, that is, information with regard to whether the platform supports mobile agents. An example of a platform profile 52 is shown in FIG. 6. This example corresponds to the various platforms that are shown in FIG. 5, and stores information with regard to whether or not each of the platforms, such as the portable computer (101 in FIG. 5) or the travel agent (102 in FIG. 5) can support a mobile agent.

(1-3-3. Agent Attributes)

The agent attributes 53 are information with regard to whether or not each of the agents has mobility, that is, the ability to move between platforms, FIG. 7 showing an example of agent attributes 53. This example corresponds to the example that is shown in FIG. 5, information being stored with regard to each of the agent names, concerning the platform to which that agent belongs and whether or not that agent is mobile, this being represented by the attribute "mobility".

The value of the mobility attribute is set at "mobile" if the agent is a mobile agent and at "stationary" if the agent is a stationary agent, this enabling the distinguishing of the existence or non-existence of mobility in each of the agents. These attribute values can be distinguished by a flag that is included in the agent information, and that indicates whether or not the agent has mobility, and by whether or not there is information with regard to movement between platforms.

The agent management section 1 can then judge and hold the agent attributes from the above-described information when an agent is newly created or when a moved agent is accepted.

The membership information represents the platform to which a stationary member belongs, or the platform at which a mobile agent is generated.

(1-3-4. Exception Description)

The exception description 54 is the expression of what type of handling is to be done of various types of exceptions that could occur when an attempt is made by an agent to move between platforms, an example of such exception description being shown in FIG. 8. In this example, the details of the handling of the following types of exceptions are set forth.

(1) The exception that an agent cannot be moved occurs because communication with a platform that has been specified as the movement destination has failed (communication time-out).

This is the case in which a notification is made to the destination platform that there is a desire to move an agent, but no response is received from that platform within a given period of time.

(2) The exception that an agent cannot be moved because the movement destination specification is invalid (move destination specification error).

This is the case in which an error is made in specifying the destination of a move. For example, it can be envisioned that this type of exception would occur when an invalid platform or domain ID is specified at the destination of a move. This type of exception can occur, for example, when an attempt is made to move an agent from the platform at which it was generated to another platform.

(3) The exception that an agent cannot be moved because the platform specified as the movement destination does not have a means for accepting the agent and causing it to act (no mobile support).

This is the case in which the platform specified as the destination of a move does not have a function that enables support of a mobile agent. This type of exception can occur, for example, when an attempt is made to move an agent from the platform at which it was generated to another platform.

(4) The exception that an agent cannot be moved because of insufficient resources at the platform specified as the movement destination (insufficient destination resources).

This is the case in which the platform specified as the destination of a move normally has the ability to accept and support operation of an agent, but happens at the time to not have sufficient resources such as memory to enable acceptance of the agent. This type of exception can occur, for example, when an attempt is made to made to move an agent from the platform at which it was generated to another platform and, after the transfer of agent data for the purpose of the move, the transferred agent restarts to operate at the destination platform.

In the case of the communication time-out exception noted in (1), the handling of the exception will differ between the case of the exception occurring on a communication circuit of high reliability and the case of the exception occurring on a low-reliability communication circuit. For this reason, the exception description for this exception includes information with regard to the low-reliability communication circuit.

(1-3-5. Information With Regard to Low-Reliability Communication Circuits)

This "low-reliability communication circuit information" is information with regard to which circuits of the communication circuits C1 through C5 that are shown in FIG. 5 have low reliability, an example of such information being shown in FIG. 9. In this example, the information stored is that, for each of the communication circuits C1 through C5, the information with regard to which platform (connection destination 1) is connected to which platform (connection destination 2) through the computer circuit and with regard to whether the communication circuit has high or low reliability. In FIG. 5, communication circuits with high reliability are indicated by bold solid lines, and communication circuits with low reliability are indicated by thin broken lines.

To simplify the description that follows, the reliability of the communication circuits between nodes are noted as single communication circuits. In reality, however, in a network such as the Internet, which has no hub, the reliability of a communication circuit between one platform and another platform is established by the reliabilities of a plurality of communication circuits. In such cases, it is possible to store the reliability of a communication circuit in terms of the reliability for each of a combination of communication circuits, or to calculate the reliability of a given path from the reliabilities of a plurality of communication circuits that make up that path.

While low-reliability communication circuit information will be described later, when a communication time-out occurs when communication occurs in an attempt to move an agent between platforms, this information can be used to check whether the currently used communication circuit has a high or a low reliability, and the "communication time-out (low-reliability communication circuit)" shown in FIG. 8 is the expression of what kind of accommodation is to be made when a communication time-out occurs when movement of an agent is attempted over a communication circuit that has low reliability.

(1-4. Configuration of the Agent Management Section)

The agent management section 1, in addition to performing management of an agent at a platform, is also the section that, by making requests to agents for agents to move to another platform or by making requests to an agent at another platform to perform processing, uses resources at another platform. In addition to having a configuration (not shown in the drawing) for generating an agent, registering an agent, and deleting an agent, this agent management section 1 has a cooperation section 11, a movement section 12, a decision section 13, an exception handling section 14, and a time-out detection section 15.

Of the above sections, when an agent uses a resource of another platform, the cooperation section 11 issues a request from that agent for processing to an agent of the other platform, this being specifically made up of a task announcement, bidding deadline, and an awarding of the task for the purpose of executing a contract network protocol. When an agent uses a resource of another platform, the movement section 12 serves to move the agent to the other platform. More specifically, the movement section 12 is configured so as to perform such processing as an overture of an agent movement to a platform specified as a destination in, for example, a plan, and to transfer information that is stored in the agent information storage section 4.

When an agent uses a resource of another platform, the decision section 13, based on the platform profile 52 and the agent attributes 53, makes a decision of either to move the agent to the other platform, or to issue a request from that agent to an agent at another platform to perform processing.

The exception handling section 14 is the section that performs action in response to exceptions, based on the exception description 54, the exception handling section 14 and exception description 54 forming an exception accommodating means for the purpose of handling exceptions that occur when an attempt is made by an agent to move between platforms. The time-out detection section 15 is the section that detects that there has been no response on a communication circuit for a given period of time, this being used in combination with the exception description for the case of a communication timeout on a communication circuit that has a low reliability.

The above elements, when communication is performed for the purpose of moving an agent using a communication circuit having low reliability, in the case in which the time-out detection section 15 detects a loss of communication, the exception handling section 14 acts so as to repeat the communication after the elapse of a preestablished amount of time, thereby effectively handling the exception.

(1-5. Field)

As noted above with regard to the field management section 7, each platform has a plurality of fields, which correspond to different purposes. These fields are regions of operation of an agent specified for each purpose and field of information processing, these being known as fields. A plurality of such fields can exist in a single platform, and the field management section 7 performs management, by each field, of resources such as memory and information used in the generation and execution of plans.

Figure 10:
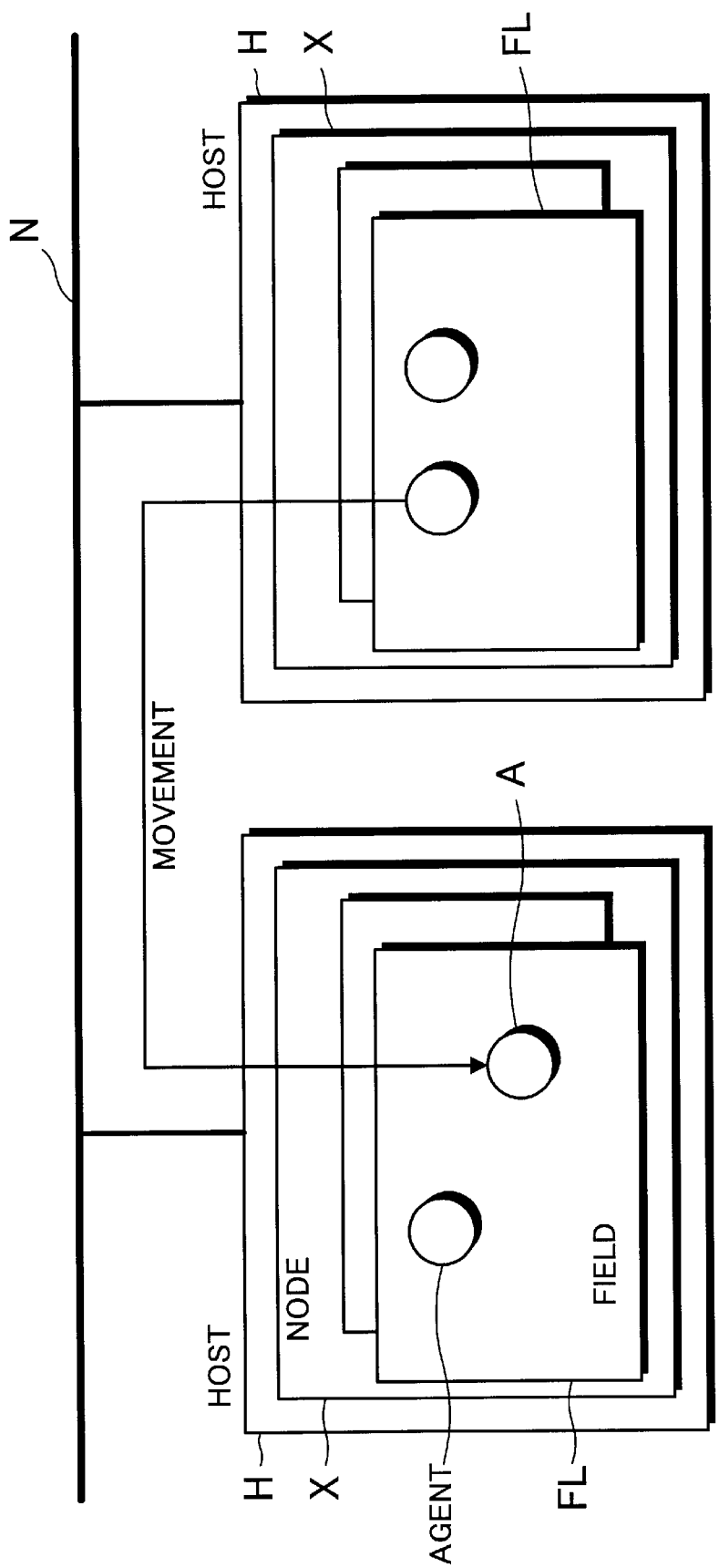
FIG. 10 is a conceptual diagram that shows a field in the first embodiment of the present invention.

Turning to FIG. 10, we see a conceptual diagram that shows an example in which a plurality of hosts (machines) H are connected with a network N, one platform, this being a node X, existing at each of the hosts H, and a plurality of fields FL existing at a node X. In an agent system such as this, the knowledge used to generate a plan is divided between the fields FL, so that when an agent is retrieving information that is necessary for planning, it is not necessary to access excessive information, thereby improving the efficiency of information processing. Knowledge that is used in planning can be classified into platform knowledge that the platform has and agent knowledge that the agent has.

(1-6. Blackboard)

Figure 11:
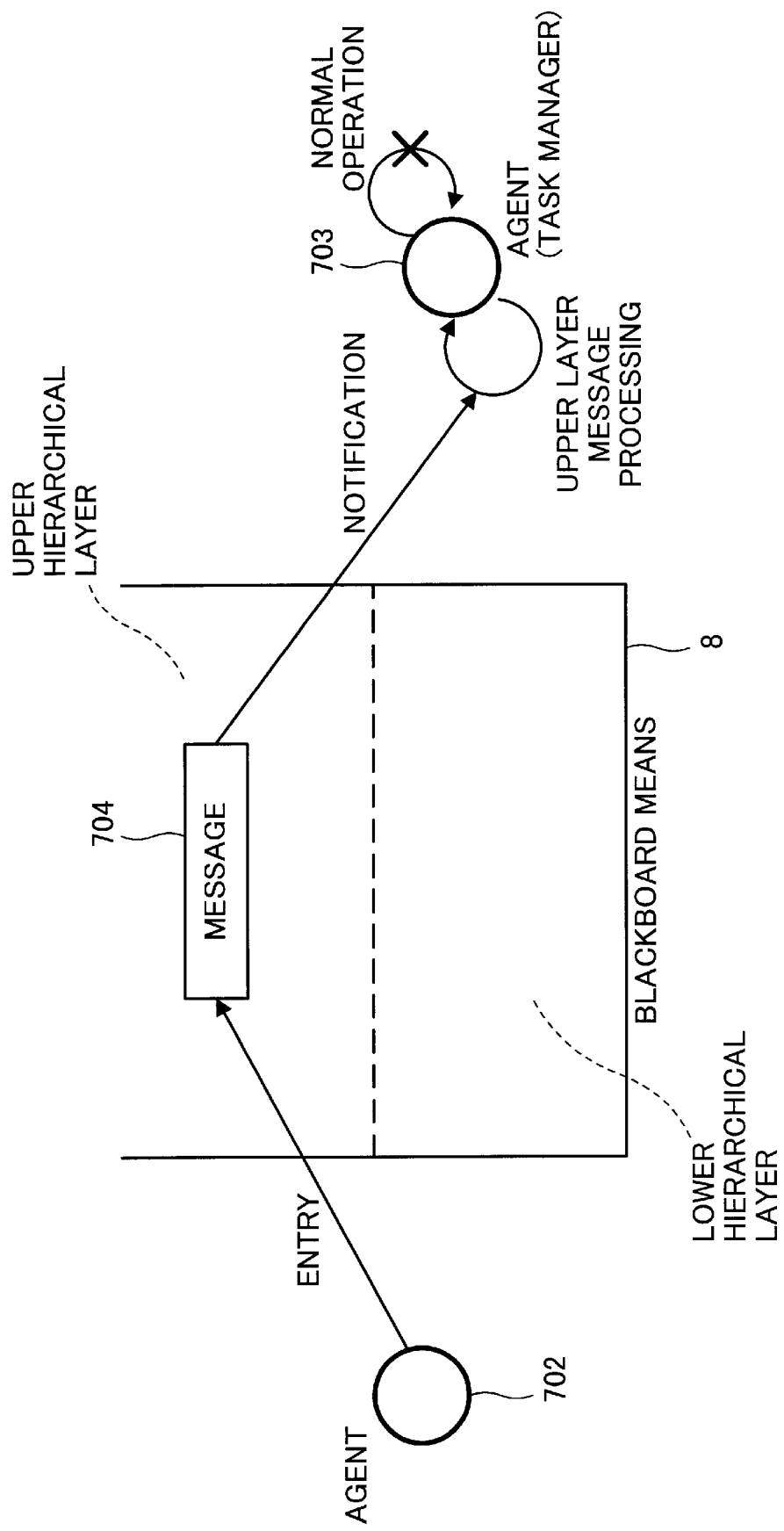
FIG. 11 is a conceptual diagram that shows the blackboard part of the first embodiment of the present invention.

The blackboard management section 9 is configured so as to make a hierarchical division of the blackboard 8 into a plurality of hierarchical levels, based on the priority of the information, thereby controlling each of the agents, including the cooperative operation thereof That is, as shown in FIG. 11, the blackboard 8 has an upper hierarchical level and a lower hierarchical level, and in the case of an unpredicted network change, for example information that needs to be quickly transferred between agents, this information would be written into the upper hierarchy of the blackboard. With respect to this, the blackboard management section 9 is configured so as to cause processing of this type of information to interrupt the normal operation of the agent. By doing this, it is possible to control the operation of an agent in response to unpredicted changes in the situations of the network.

(1-7. Other Aspects of Platform Configuration)

While FIG. 4 shows the example of the configuration of a single node, that is, the configuration of a single platform, this is merely one example of many platforms that are included in the above-noted embodiment of an information processing apparatus, and it can be envisioned that there are other platforms having a configuration that is partially different from that shown. For example, in a platform that does not support a mobile agent, there is no need for the movement section 12 or the time-out detection section 15. Additionally, when performing exchange of information between agents, when using a blackboard 8 and a blackboard management section 9 of one specific platform, there is no need for other platforms to have a blackboard 8 or blackboard management section 9.

As an additional example, it is possible to have a platform that does not have a planing function, and such a platform does not need to have the planning knowledge 51 and the planning section 2. In a platform that does not have a plurality of fields, the field management section 7 would be unnecessary.

2. Action

Figure 12:
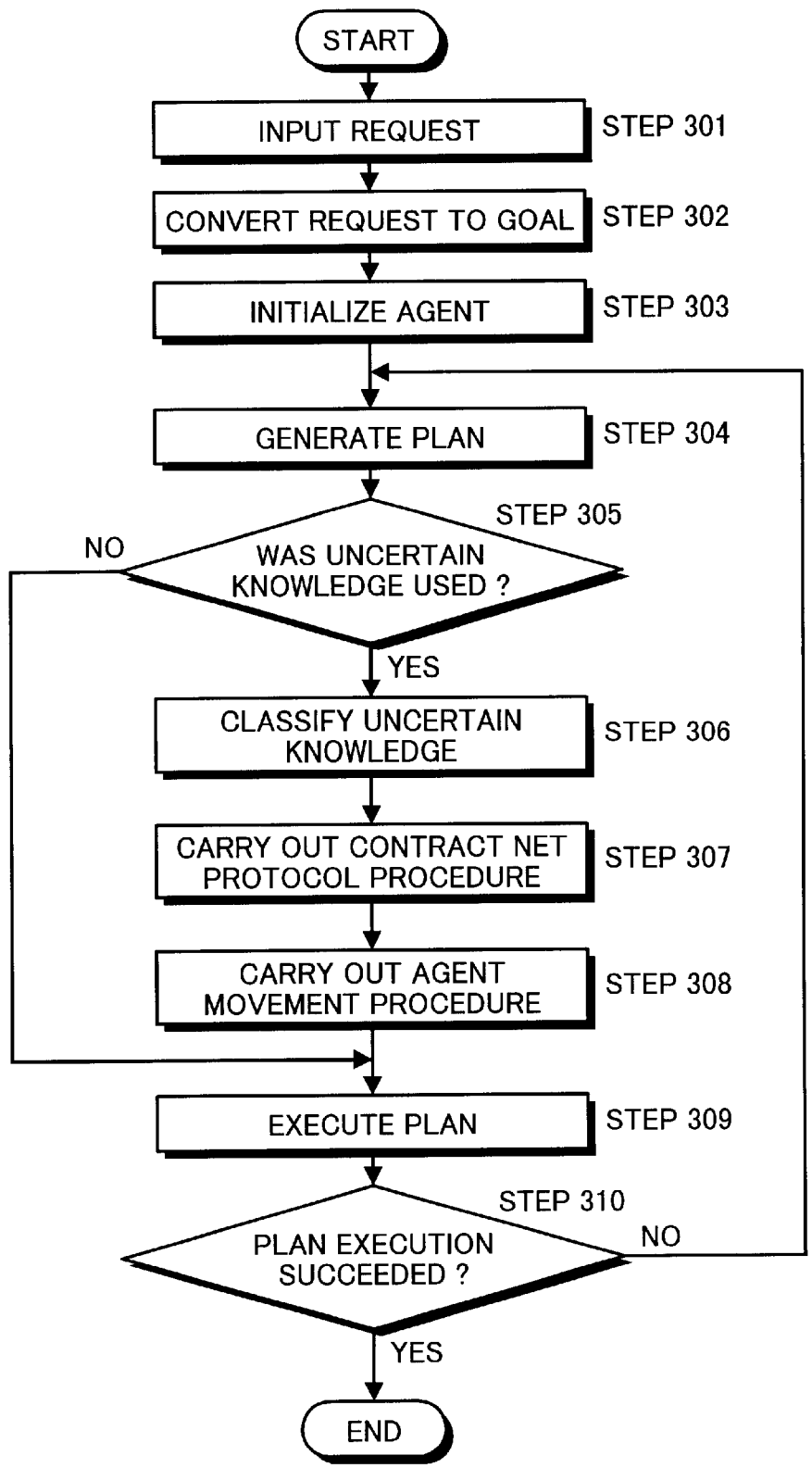
FIG. 12 is a flowchart that shows the processing procedure in the first embodiment of the present invention.

An embodiment of the present invention configured as described above operates in the following manner. FIG. 12 is a flowchart that shows the processing procedure of this embodiment.

(2-1. Input of Request)

First, a user inputs a request to the system via the input/output section 20 of a portable computer (step 301). The status to be achieved as a result of information processing is expressed by describing in a preestablished format. For example, the user inputs a request with regard to a travel itinerary and ticket reservation as noted below.

Departure location: Tokyo
Departure time: November 3
Arrival location: Regional university
Arrival time: By noon, November 3
Transportation means used: Air (2-2. Conversion to a Goal)

A request that is entered as indicated above is then converted to a goal (step 302). This goal is expressed as the status to be achieved by information processing by the agent, in a format that can be processed by the agent and the planning section 2. For example, the above-noted request with regard to a travel itinerary and ticket reservation is converted to the following goal.

plan_and_reserve_tickets([
   departure_place(tokyo),
   departure_date(11,3),
   arrival_place(a_university),
   arrival_date(11,3),
   arrival_time(by, 12,0),
   transport(air)])

(2-3. Agent Initialization)

When the request is converted to a goal as noted above, the platform agent management section 1 creates an agent to be used in the achievement of the goal, and executes a procedure for initialization (step 303). For example, if an agent is created with the name "user," the initialization procedure would perform such processing as registering the name "user" in a list for the purpose of agent management, setting the prescribed initial values of internal variables of the agent user, and allotting a time slice (CPU time) of the time-sharing system to the agent user.

In a platform in which there are a plurality of fields (FIG. 10), each agent is generated within a specific field, under management of the agent management section 1. Then, in subsequent planning performed by the planning section 2, the knowledge management section 6 reads out and provides knowledge with respect to that field.

(2-4. Planning)

Next, the planning section 2 generates a plan by planning for the purpose of achieving the goal to which conversion had been done (step 304). In this process, the planning knowledge 51 includes information as to what type of operations the agent can execute, this being a part of the plan. This type of operational unit is known as an action, and pre-conditions and post-conditions are established beforehand for each such action.

A pre-condition is a condition that is required before execution of an action, and a post-condition is a condition that is created by the execution of the action. For this reason, if a post-condition that is a given action is achieved, an action that has that post-condition as a pre-condition can be executed. For example, to perform the operation of "copy a file," a necessary pre-condition is "file exists at the current platform," and the post-condition "copy of file exists" is a result of performing the action of copying.

Specifically, the process of generating a plan is one of discovering an action that creates the ultimate goal as a post-condition, then discovering another action that creates the pre-condition of the above-noted action as its post-condition, this processing being continued until the status (current status) before execution of the plan is joined to the ultimate goal status by a series of actions. FIG. 13 shows an example of a plan midway in the generation process, in which example the actions which have as post-conditions C5, which is one of the pre-conditions of the action P2, and C7, which is the pre-condition of the action P3, have not yet been found. In this case, a pre-condition that is created as a post-condition by another yet-to-be-found action is known as an unachieved goal.

Figure 14:
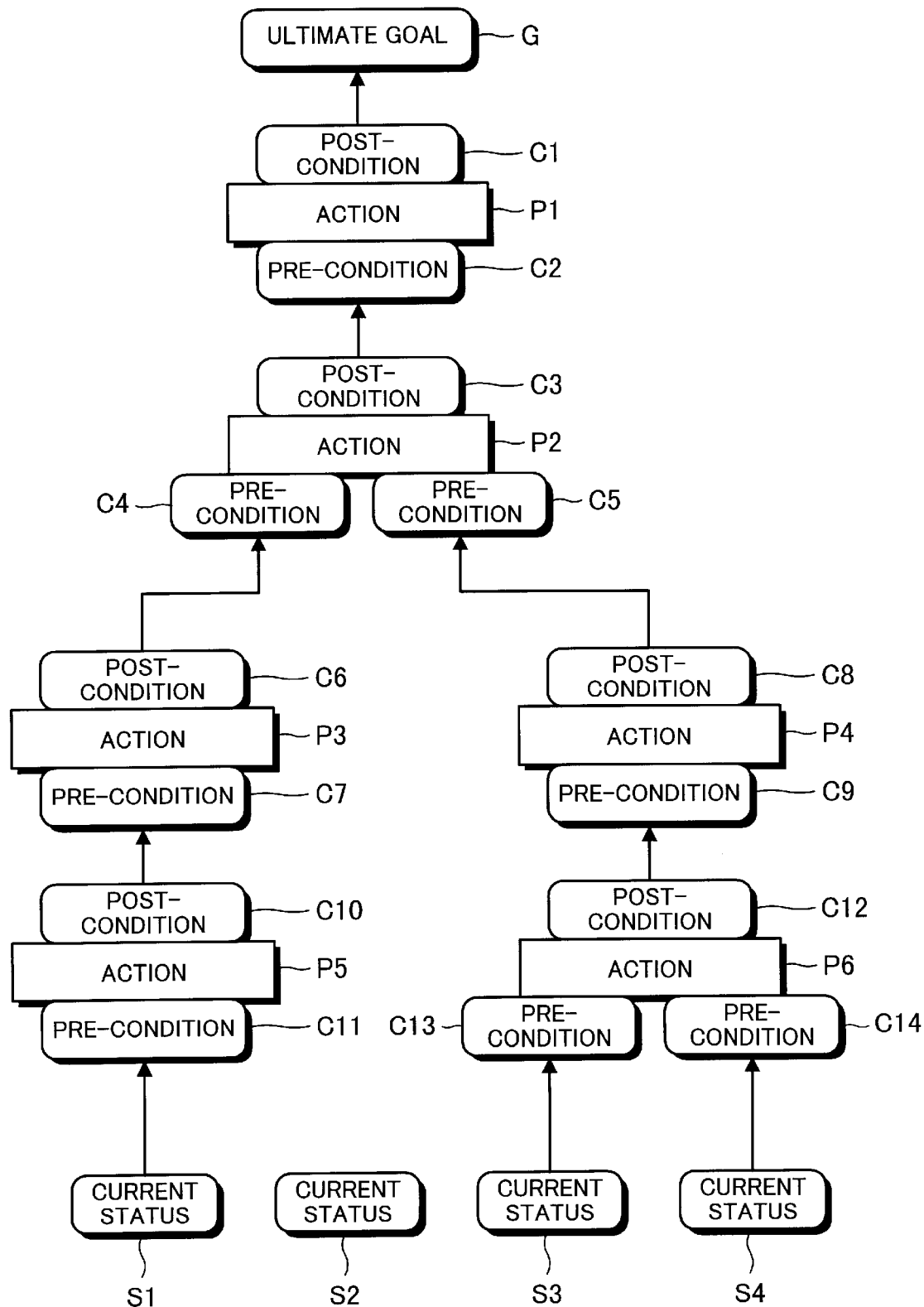
FIG. 14 is a conceptual diagram that shows a completed plan in the first embodiment of the present invention.

In the above-noted processing to generate a plan, the causal factor are back-tracked from the goal side, the plan generation process being completed when the status (current status) existing at the start of the execution of the plan is reached. FIG. 14 is a drawing that shows an example of a plan completed by this back-tracking process.

Figure 15:
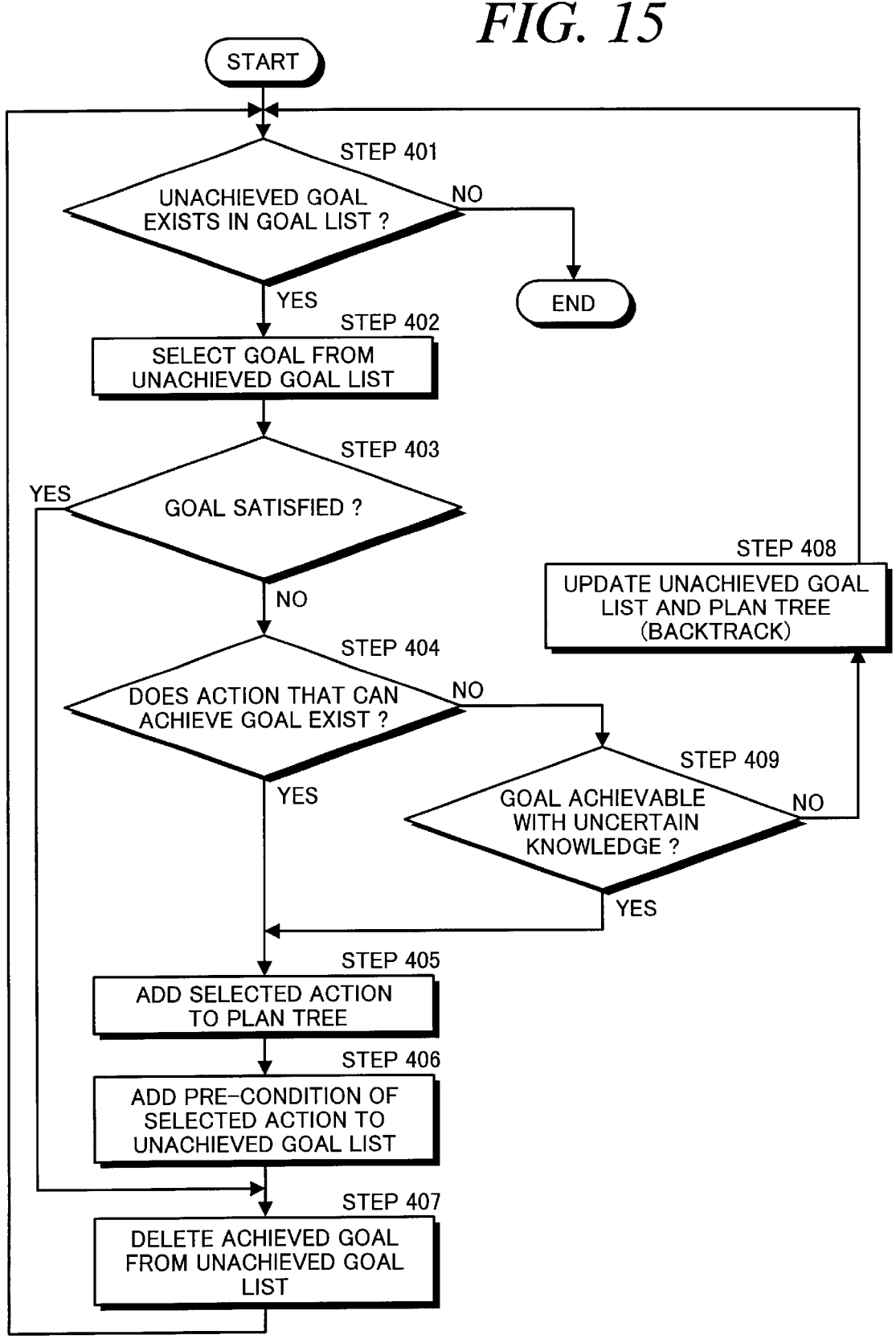
FIG. 15 is a flowchart that shows a specific procedure of a plan in the first embodiment of the present invention.

Next, FIG. 15 shows a specific procedure for plan generation. In the procedure shown, part of a goal list into which goals are stored is taken as an unachieved goal list for storage of yet-unachieved goals, such as shown in FIG. 13, with the following processing being performed. First, one unachieved goal at a time is selected (step 402) from the unachieved goal list, until there are no longer any unachieved goals in the goal list (step 401), the following operations being performed, except in the case in which the goal is satisfied (step 403). Specifically, if there is an action that can achieve a pre-condition, which is a goal, by virtue of a post-condition step 404), this action is selected (step 405), the action selected in this manner (selected action) being added to the series of actions (plan tree) such as shown in FIG. 13 (step 405).

In the case in which there is no action that achieves the goal, a judgment is made as to whether or not the goal can be achieved by uncertain knowledge. The term "uncertain knowledge" is used here to refer to the part of knowledge with regard to the network configuration, the specific value of which, such as the truth of which, is unknown unless some processing is done at another platform. In the case in which a goal can be achieved with uncertain knowledge, the action of selecting this uncertain knowledge is added to the action tree (step 405), but if achievement of the goal is impossible even using uncertain knowledge, processing is back-tracked (step 408), so that the action that achieves the current unachieved goal is replaced by another action, and processing is performed again.

For example, with the platform knowledge used by the user, consider the case in which "file a exists at platform A." In this case, if the user gives the goal of obtaining file a, the knowledge that the file exists at platform A will be accessed, so that the plan of the agent that was created will be "move to platform A and send a copy of file a to the platform of the user."

However, if at the point at which the agent moves to platform A file a had been moved to platform B, because file a will not be found, the plan execution will fail this resulting in replanning at platform A When this occurs, the platform B knowledge is updated with the movement of the file and, if the change is made to "file a exists at platform B," the contents of the new plan will be changed to "move to platform B and send a copy of file a to the platform of the user." As a result, the agent can autonomously move to platform B, successfully find file a, and send it to the user's platform.

(2-5. Judgment as to Whether Uncertain Knowledge Has Been Used)

When a planning procedure such as described above is completed (step 304 in FIG. 12), the decision section 13 makes a decision as to whether or not uncertain knowledge had been used in the planning (step 305). Whether or not uncertain knowledge had been used can be judged based on a recording whenever uncertain knowledge is used in planning, or the judgment can be made by performing a retrieval of the plan that was generated itself, see whether it includes uncertain knowledge.

(2-6. Classification of Uncertain Knowledge)

Because uncertain knowledge is that knowledge which is verified by processing at another platform (which shall be called the target platform), if a plan makes use of uncertain knowledge, in order to achieve the purpose of the plan, it is necessary to verify this uncertain knowledge, the processing for verification of the uncertain knowledge being performed before the execution of the plan.

The decision section 13 makes a decision, for each uncertain knowledge, as to whether verification of the uncertain knowledge is to be performed by moving an agent or by agent cooperation, making, for example, the two classifications of "movement" and "classification" (step 306). By this classification, if the following three conditions (1) through (3) are simultaneously satisfied, the decision section 13 decides to verify the uncertain knowledge by movement. If even one of the conditions is not satisfied, the decision section decides to verify the uncertain knowledge by cooperation.

(1) The reliability of the communication circuit that connects the platform at which the agent resides to the target platform is low.

This is because if the communication circuit reliability is high, it is possible to continue communication with the target platform. It is possible to ascertain this type of communication circuit reliability from information with regard to communication circuit reliability (FIG. 9), as follows. For example, the information shown in FIG. 9 include information as to what platforms are connected to what other platforms by each of the communication circuits. For this reason, a search is made for a communication circuit connecting two platforms that coincide with the current platform and the target platform, and the corresponding communication circuit reliability is simply read out.

(2) The target platform supports a mobile agent.

(3) The agent is a mobile agent.

This is because unless the target platform and the agent both support mobility, it is not possible to move the agent or to allow it to operate at the destination platform. With regard to the above two conditions, whether or not the target platform supports a mobile agent can be judged by accessing the platform profile 52 that is shown by example in FIG. 6, and whether or not the agent has mobility can be judged by accessing the agent attributes 53 that are shown by example in FIG. 7.

It should be noted that it is not absolutely necessary to make a decision based on all three conditions. For example, if it is known beforehand that all of the platforms in a network support mobile agents, it is possible to make a decision based on one or two conditions. If a platform that can verify uncertain knowledge or an agent at that platform is not a mobile agent, it is possible to add to the judgment items whether or not cooperation is supported.

Next, verification of uncertain knowledge is performed, following the above-noted classification. That is, with regard to uncertain knowledge for which a decision has been made that cooperation will be used for verification, the cooperation section 11 performs verification (step 307), based on a contract network protocol, and with regard to uncertain knowledge for which a decision has been made that verification will be done by movement, the movement section 12 performs the verification by moving the agent (step 308).

Because the decision as to whether verification of uncertain knowledge is to be done by movement or by cooperation is made by the decision section 13 after planning, it is not necessary to specify in the plan whether uncertain knowledge verification is to be done by movement or by cooperation, thereby simplifying the planning procedure and improving the efficiency of processing.

(2-7. Contract Net Protocol Procedure)

Figure 16:
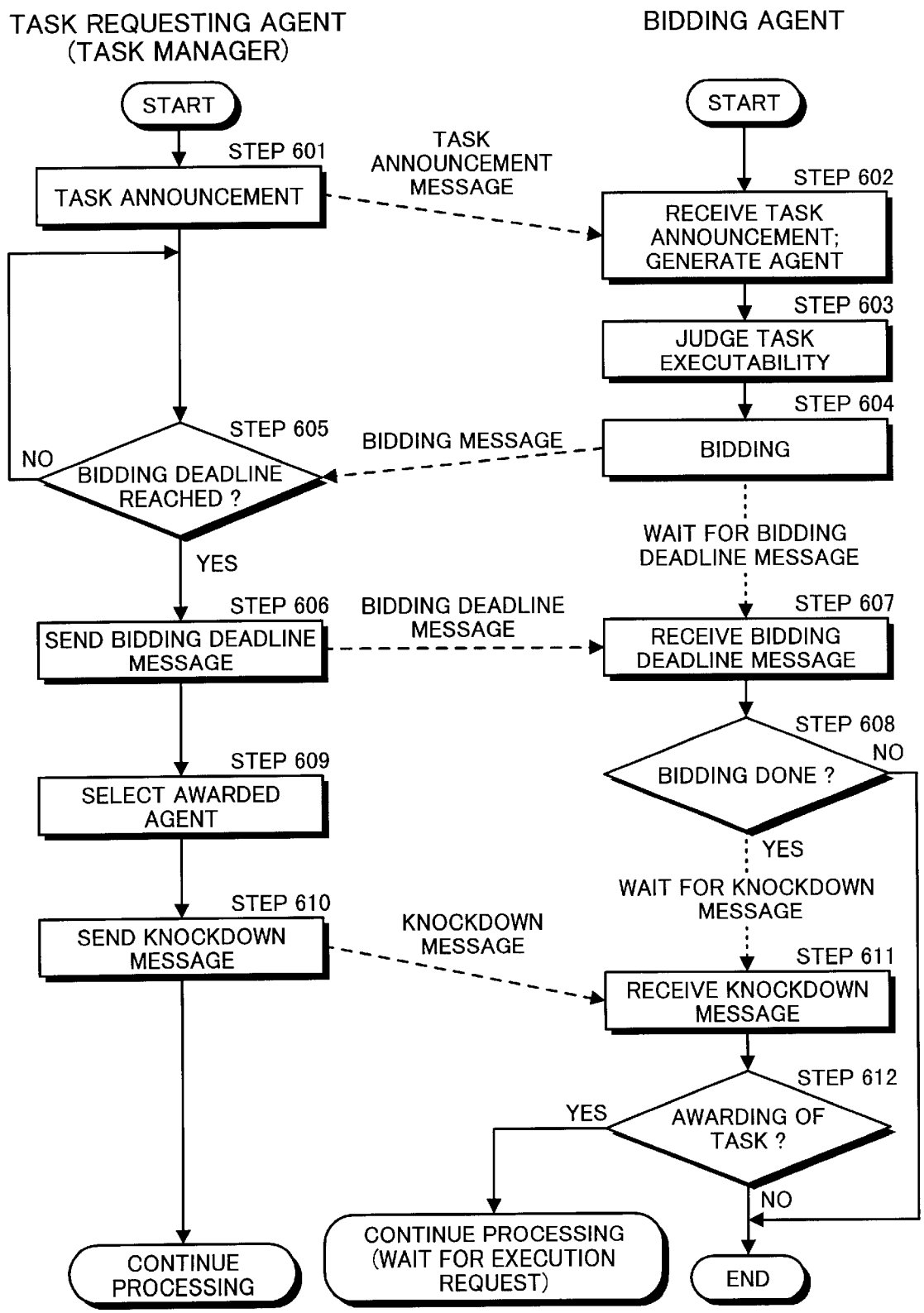
FIG. 16 is a flowchart that shows the procedure of a contract net protocol in the first embodiment of the present invention.

Next, the details of a contract net protocol procedure are shown in FIG. 16 (refer to Smith, R. G., "The Contract Net Protocol: High-level Communication and Control in a Distributed Problem Solver", IEEE Trans. Computers, Vol. 29, pp. 1104–1113 (1980)). In the contract net protocol, work that is to be requested by one agent of another agent is known as a task, and the network protocol of making task requests between agents is actually carried out between the cooperation sections 11 of the platforms at which the agents exist.

(2-7-1. Task Announcement)

In the contract net protocol, when a task execution is to be requested, the agent that has the task (hereinafter referred to as the task manager) first, at step 601, broadcasts information (hereinafter referred to as task information) to the group of platforms to which the task request is to be made. The term broadcast refers to the uniform sending of information to a given range of locations, and the sending of task information is known as task announcement. The task information that is broadcast includes such information as a task ID, details of the task, the task manager ID, the plan evaluation criteria, and the bidding deadline.

(2-7-2. Bidding)

A platform that receives task information as described above generates an agent in each field and transfers this task information (step 602). Each agent that receives the task information makes a judgment as to whether or not execution is possible in the field to which it belongs (step 603) and an agent that can execute the contents of the task sends information indicating a desire to bid (known hereinafter as bidding information or a bidding message) to the task manager, that is, the agent makes a bid (step 604). An agent that has sent bidding information is known as a bidding agent.

Bidding information includes, for example, the task ID, the agent ID, and such information as the task execution plan evaluation value, of which the task execution plan evaluation value is the evaluation made by the bidding agent itself as to its execution of the task, based on the plan evaluation criteria indicated by the task announcement.

(2-7-3. Bidding Deadline and Awarding)

The task manager receives bidding information while comparing the current time with the bidding deadline and, when the bidding deadline is reached at step 605, at the next step, 606, a message is sent that indicates the closing of bidding. This bidding closing message is broadcast to all the platforms that were the subject of the request made by means of the task information. At step 609, the task manager decides on the agent to be awarded the task. This decision is made by comparing the bidding information of each of the agents, based on a comparison of the task execution plan evaluation in the bidding information from each of the agents that was received before the bidding deadline with a preestablished decision criterion.

The decision with regard to the agent to be awarded the task (the awarded agent) is the decision of the agent to be specified as the actual destination of the task request. The actual timing of the task request, however, can differ depending upon the type of processing, there being cases in which the request is made immediately after completion of the contract net protocol and cases in which the request is made after waiting a prescribed amount of time.

When the agent to be awarded the task is decided upon, the task manager, at step 610, sends a multicast of awarding information that expresses the details of the award to each of the bidding agents. Upon receipt of this awarding information, the awarded agent goes into the status in which it waits for an execution request to actually execute the task. The task manager subsequently makes a request of the awarded agent to execute the task, resulting in the actual execution of the contents of the task by the awarded agent.

As described above, in this embodiment of the present invention a net contract protocol is used to implement cooperation between agents. When the net contract protocol is used to request processing from another platform, a bidding system is used to achieve harmony between the conditions of the requesting platform and the capacity of the request-receiving platform. By doing this, it is possible to achieve superior overall system processing efficiency.

(2-8. Details of Agent Movement)

Figure 17:
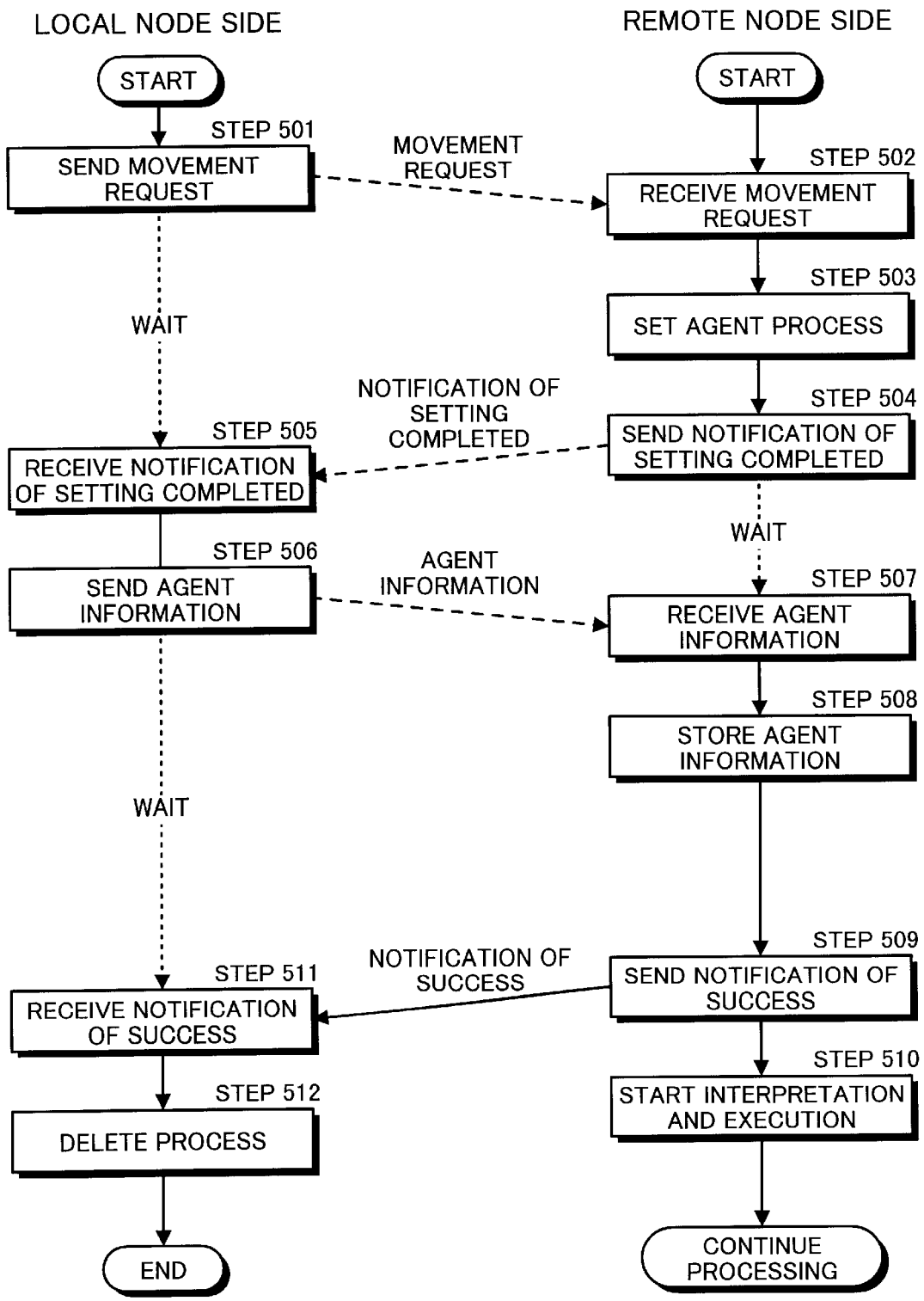
FIG. 17 is a flowchart that shows the procedure for movement of an agent between platforms in the first embodiment of the present invention.

The procedure for the case in which an agent is moved between platforms is shown in FIG. 17. In this example, the original platform before the movement of the agent is called the local node, and the destination platform is called the remote node. In this case, the remote node that receives (step 502) the request (step 501) for movement to the remote node from the local node sets the process for the agent (step 503).

Then, the local node that receives (step 505) a notification sent from the remote node that the setting of the process has been completed (step 504) sends agent information such as the agent plan and variable ranges to the remote node (step 506). Upon receiving this agent information (step 507), the remote node stores the agent information (step 508), sends notification that the movement of the agent has succeeded (step 509), and starts the interpretation and execution of the plan (step 510). Upon receiving the notification of success (step 511), the local node deletes agent processes that are no longer required (step 512).

(2-9. Plan Execution)

At the judgment made at step 305 in FIG. 12, if it is judged that uncertain knowledge is not used in the plan, execution section 3 immediately executes the plan (step 309) and, when the execution succeeds the procedure ends. If the execution fails, however, replanning is performed. In the case in which the plan uses uncertain knowledge, as described above, the contract net protocol (step 307 in FIG. 12) or agent movement is used to verify the uncertain knowledge, at which point, since the plan is substantially completed, the execution section 3 executes the plan (step 309).

While it can be envisioned that there will be variations in the specific configuration and information processing, such as with regard to just what point the above-noted contract net protocol or agent movement is performed, how the results thereof are to be used, and just how replanning is to be done in various situations, one example that can be envisioned is as follows.

In this example, movement is not done uniformly even if the movement conditions have been satisfied, plans for both movement and cooperation being generated and compared, and the most advantageous of the two being executed. In this case, the contract net protocol procedure of step 307 is first used to generate a trial plan to achieve the goal, followed by generation of a plan for movement to a platform which can verify uncertain knowledge, using the agent movement procedure of step 308. Then, these two plans are evaluated in terms of the cost of the amount of data and communication required, the plan being most advantageous in terms of low cost being selected and executed. If the execution fails, the above-noted planning procedure is repeated as replanning.

(2-10. Handling Exceptions at the Time of Movement)

In this embodiment of the present invention, when an attempt is made to move an agent between platforms, even in an exception such as an error occurs, the exception is handled by the exception handling means 14, based on the exception description 54. For example, a case can be envisioned in which, with respect to a plan to move from a local node platform to a remote node platform, during the sending of the execution notification for the movement procedure the response from the destination is cut off, so that time-out occurs.

Specifically, in a case in which a low-reliability communication circuit is used to make a movement, the time-out detection section 15 detects the time-out and notifies the exception handling section 14 thereof, this exception handling section 14 performing the following exception handling actions, in accordance with exception description such as shown in FIG. 8.

More specifically, the exception handling section 14 first places the movement section 12 of the destination platform into the waiting status, and retries communication with the destination each time a pre-established amount of time has elapsed. If in this retry process a response is indeed received by the computer at the destination, the movement section 12 continues the normal movement procedure. Subsequently if a break in communication occurs again, the wait status will be enabled once again and, as described above, the retry will be repeated after the waiting time.

(2-11. Information Exchange Between Agents)

When cooperation is performed between agents in response, for example, to a task request as part of the contract net protocol, it is desirable that one agent control the behavior of another agent, so as to be able to flexibly accommodate an unexpected change in situation. In this embodiment of the present invention, the hierarchical blackboard section 8 and blackboard management section 9 that are shown in FIG. 11 are used in the following manner to achieve this flexible accommodation.

Specifically, each agent is caused to correspond to one hierarchical level of the blackboard 8, depending upon its priority. In the example that is shown in FIG. 11, the agents 702 and 703 are both placed on a lower hierarchical level of the blackboard 8. The normal information that is sent to other agents is entered on the level having the same priority as the sending agent, the receiving agent accessing the lower level of the blackboard 8 when it has a break in its processing, thereby enabling it to find messages addressed to it.

If an agent enters data into an upper hierarchical level that has a higher priority than its normal priority is set to, this type of entry is detected by the blackboard management section 9, notification of the information being made to the addressee agent of the information by means of, for example, a hardware interrupt. In this manner, this embodiment uses a hierarchically configured blackboard 8, so that information that is entered with a high priority is processed with a higher priority than information with a lower priority.

For this reason, by entering information to be exchanged between agents into a hierarchical level in accordance with its priority, because it is possible to flexibly control the cooperative relationship between agents, the flexible accommodation of unpredicted changes in situation is facilitated. By setting the priority by individual agents, using a higher hierarchical level the higher is the priority of the agent that is exchanging information, and also performing processing of input and output of information with respect to the blackboard 8 with a higher priority, it is possible to perform even further detailed control.

3. Information Processing Example

Next, an example of how the above-described operation of this embodiment of the present invention can be used to process the example problem shown in FIG. 5 will be described.

(3-1. Request Input and Initial Planning)

At stage of the initial planning based on the above-noted goal of plan__and__reserve__tickets ( . . . ), because the goal is not yet satisfied, the planning section 2 asks the knowledge management section 6 for an action that satisfies the goal. However, while the portable computer 101 is configured to be able to accept a request, we will assume that it does not have a reservation procedure for the ticket required to achieve the goal.

In the above-noted case, the knowledge management section 6 retrieves planning knowledge from within the knowledge storage section 5, the result being that a judgment is made that there is insufficient action to satisfy the goal. Given this situation, the knowledge management section 6 notifies the planning section 2 that it might be possible to satisfy the goal by using the uncertain knowledge maybe(plan_and_reserve_tickets(Requirements),ta)

Figure 18:
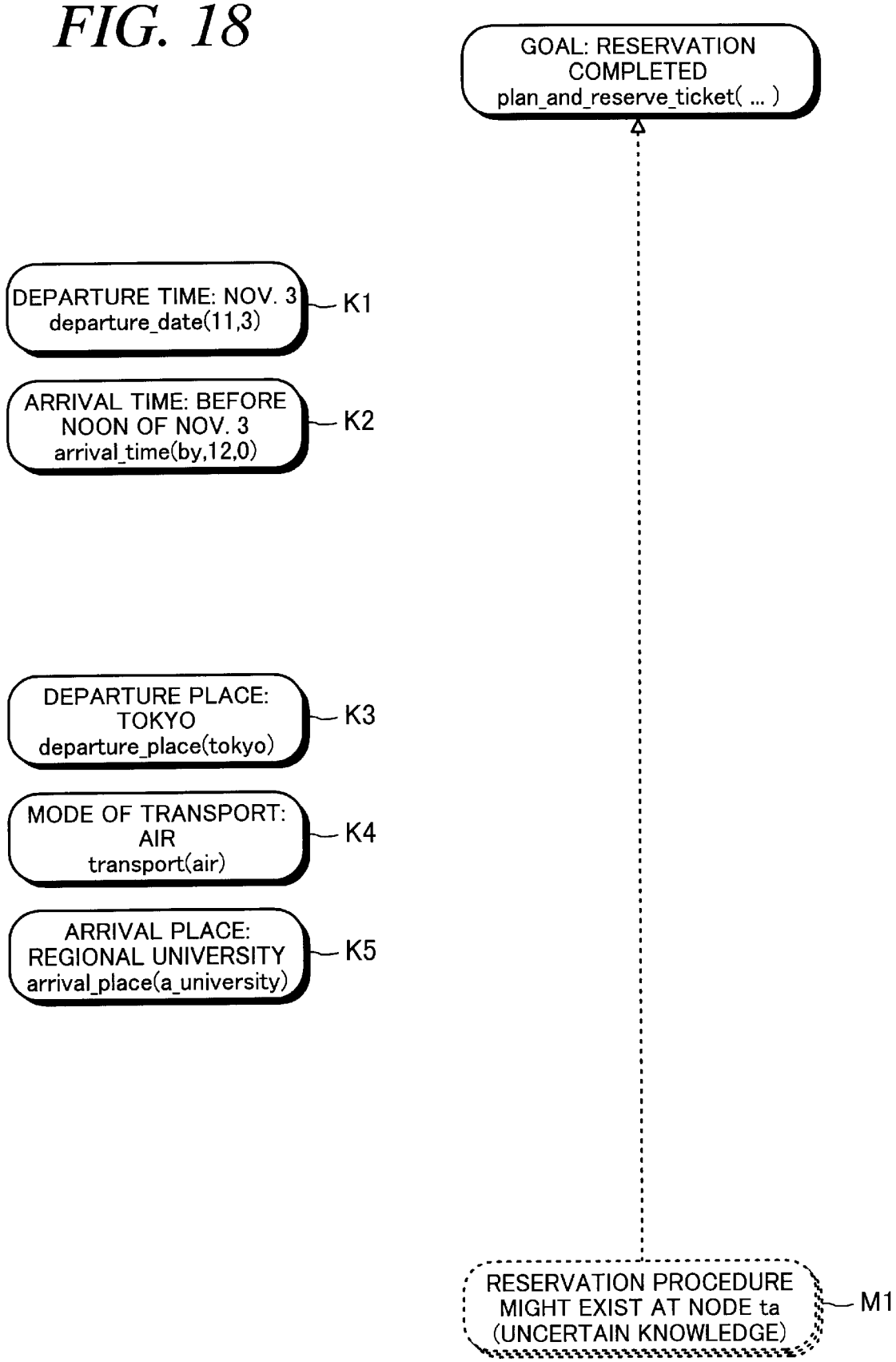
FIGS. 18–21 are conceptual diagrams, each of which shows the midway progress to achieving the goal in the example of the problem in the first embodiment of the present invention.

This uncertain knowledge is the knowledge that the ticket reservation procedure might be at the travel agent 102, this being node ta, and the planning section 2 uses this uncertain knowledge to generate a plan. At this point, the relationship between the goal and the uncertain knowledge is as shown in the conceptual diagram presented as FIG. 18. In FIG. 18, established knowledge such as K1 through K5 are represented by solid lines, while uncertain knowledge such as M1 is indicated by broken lines.

(3-2. Movement to the Travel Agent)

The agent management section 1 asks the knowledge management section 6 what kind of communication circuit makes the connection to node ta, which is the platform which can be used to verify the uncertain knowledge, and whether the agent user and the node ta support mobility.

In this case, the knowledge management section 6 accesses information with regard to the reliability of the communication circuits described into the knowledge storage section 5 and, because it discerns that the portable computer 101 is connected to the node ta by the communication circuit C1, which has low reliability (refer to FIG. 9), information to that effect in the format of mobile_ communication(ta) is returned to the agent management section 1.

In the same manner, the agent management section 1, based on the platform profile 52 and the agent attributes 53 that are stored in the knowledge storage section 5, verifies that both the agent user and the node ta support mobility.

In this case, the agent management section 1 verifies the following conditions for the purpose of moving the agent.

(1) The reliability of the communication circuit that connects the platform at which the agent resides to the target platform is low.

(2) The target platform supports a mobile agent.

(3) The agent is a mobile agent.

As a result of checking that the above conditions are satisfied, the planning section 2 generates a plan for movement to the node ta, and the movement section 12, according to this plan, moves the agent user to the node ta.

(3-3. Planning Based on the Reservation Procedure)

Figure 19:
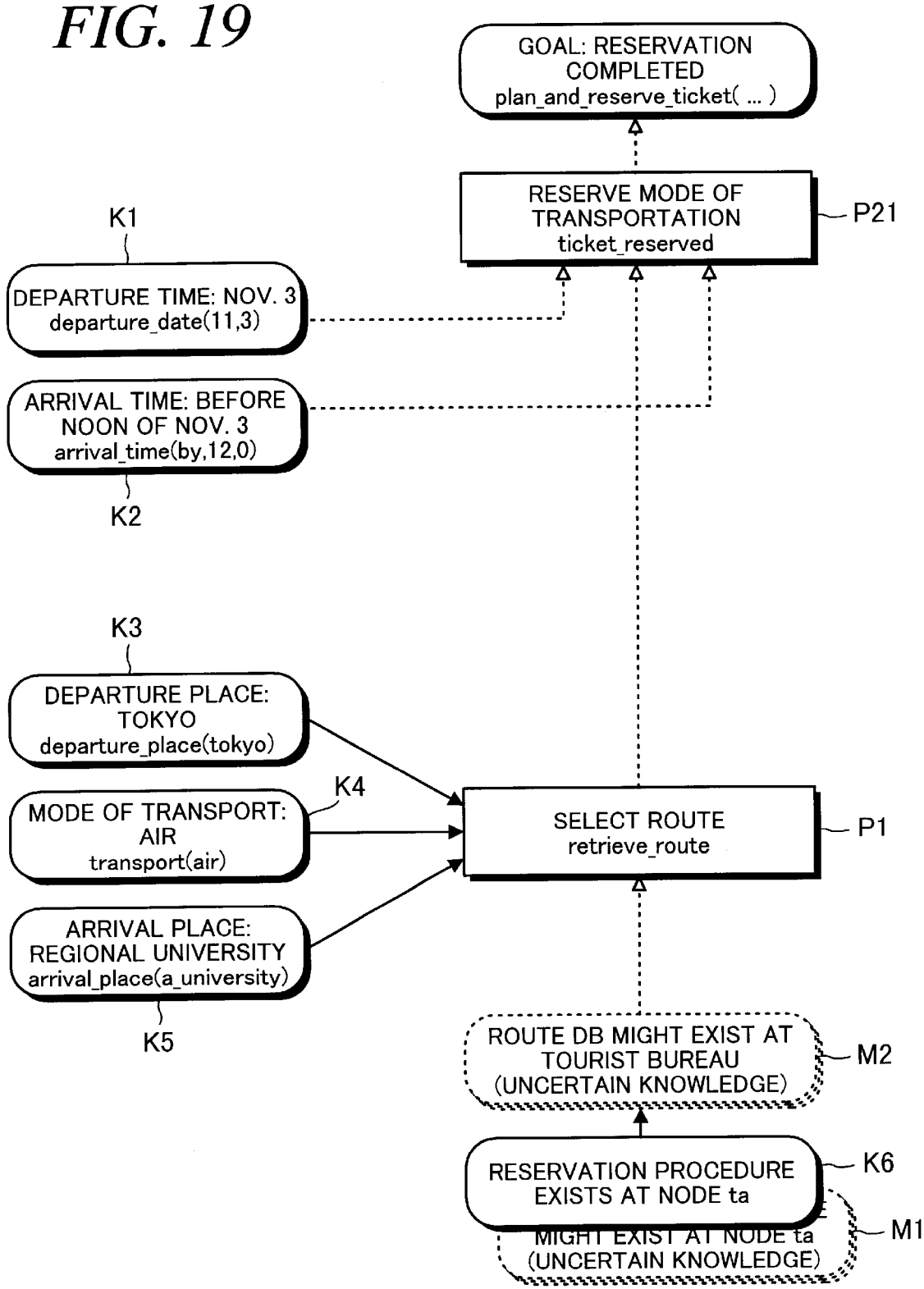

At node ta, a reservation procedure that specified uncertain knowledge is found, the uncertain knowledge M1, as shown in FIG. 19, becoming the established knowledge K6. For this reason, the agent performs replanning so as to achieve the goal of resolve_goal(plan_and_reserve_ tickets( . . . ) by using the reservation procedure that is indicated by this knowledge K6. As a result, the following plan is generated.

retrieve_route(
    departure_place(tokyo),
    arrival_place(a_university));

retrieve_tt;
reserve_tickets;

This plan, as shown in FIG. 19, is a plan to achieve the goal of completion of the reservation by performing processing P1, by which the route is decided, and processing P21, by which the transportation reservations are made. Next, the execution section 3 starts execution of this plan.

(3-4. Retrieving the Route by Movement)

In this execution, first the procedure retrieve_route(
    departure_place(tokyo),
    arrival_place(a_university))

is executed. This operation is shown as processing P1 in FIG. 19, and is the operation of retrieving a travel route having its staring point in Tokyo and its arrival point at the regional university. However, because there is no database at the node ta with regard to routes to the regional university, the plan is judged to fail.

This being the situation, the replanning is performed, with the goal being the pre-condition exists(routeDB(tokyo,a_university))

of the processing retrieve_route(
    departure_place(tokyo),
    arrival_place(a_university))

which was the cause of the failed plan execution. This pre-condition means that there exists a route database (DB). As a result of this replanning, the fact that this precondition can be satisfied by the uncertain knowledge maybe(exists(
    routeDB(tokyo,a_university),
    a_tourist_bureau_site))

is learned from a notification from the knowledge management section 6 (FIG. 19).

The contents of the uncertain knowledge M2 are that a route database might exist at the tourist bureau 105. When the agent management section 1 performs classification with regard to this uncertain knowledge, as seen from the current node ta of the agent, the target platform a_tourist_bureau_site, which is the tourist bureau 105 is, as expected, learned to be connected by a circuit having a low reliability. As already noted, the agent user supports mobility, as does the tourist bureau target platform 105 (FIG. 6).

Figure 20:
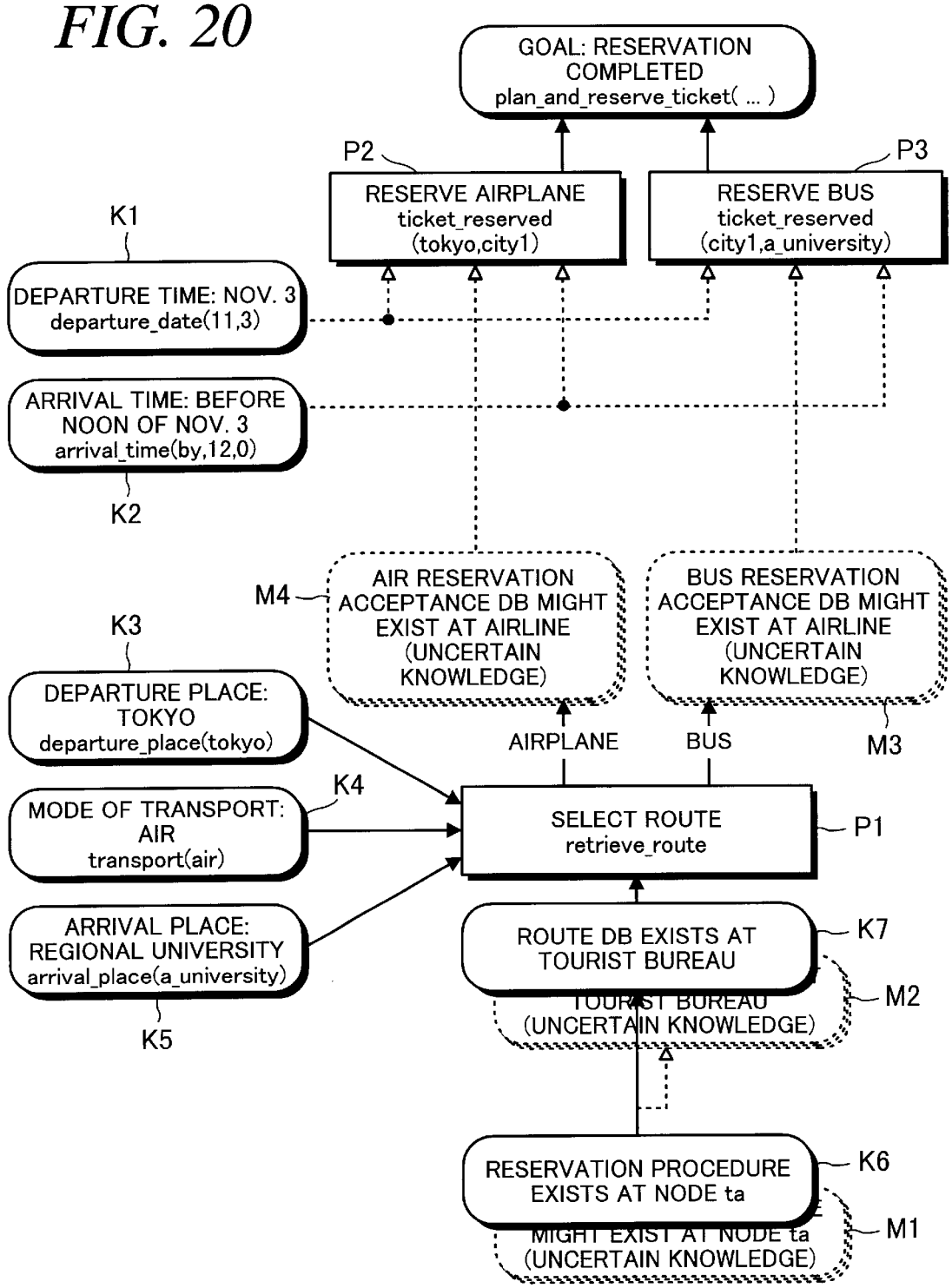
Figure 21:
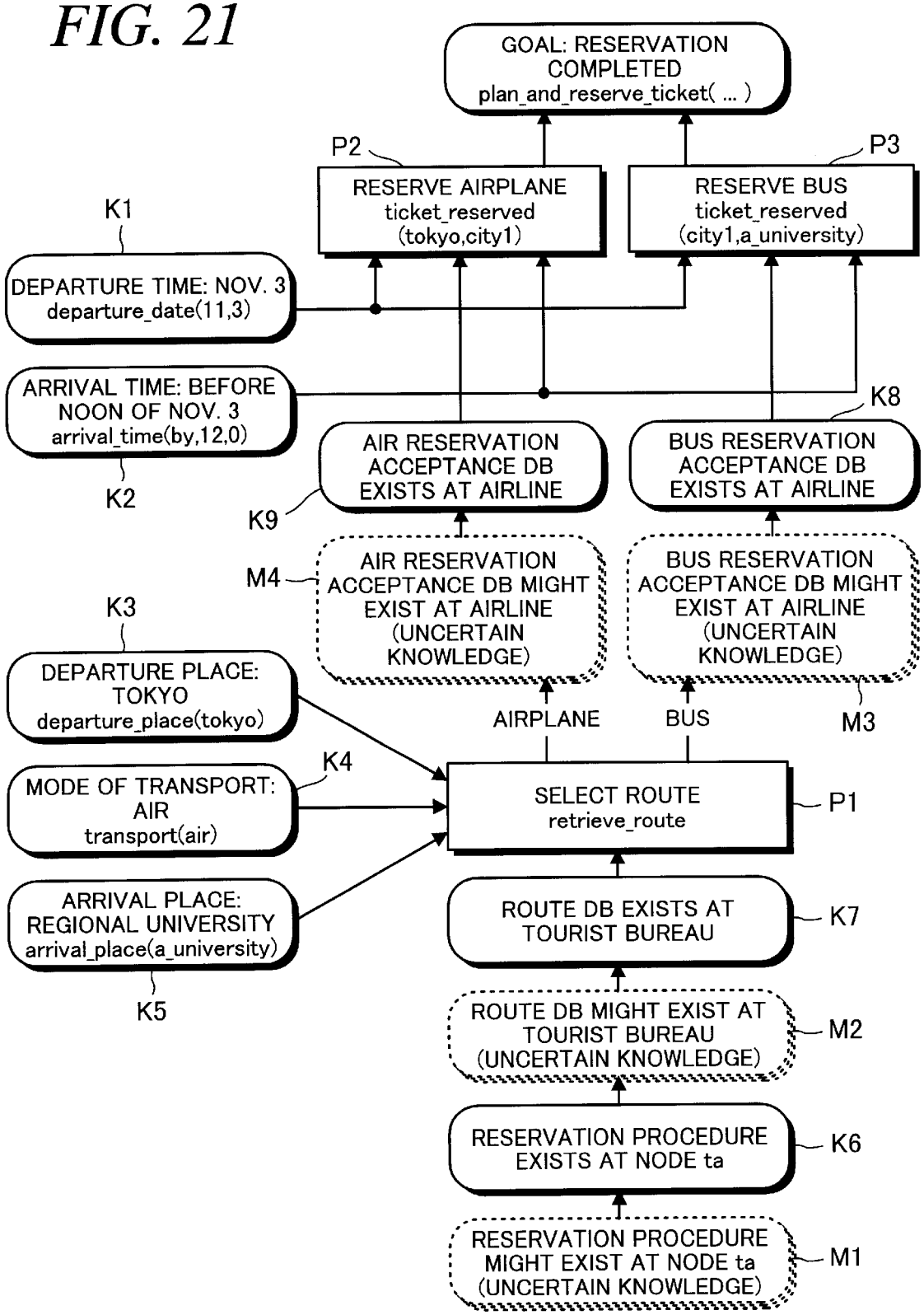

For this reason, this uncertain knowledge is also judged to be verifiable by means of movement, the planning section 2 performing planning and execution of a plan for performing retrieval after the movement of the agent to the tourist bureau 105, followed by return to the travel agent 102 once again. This time the processing P1 for retrieving the following information from the database at the tourist bureau 105 succeeds so that, as shown in FIG. 20, the uncertain knowledge M2 becomes the established knowledge K7.

route([tokyo,city1], [city1,a_university])
route([tokyo,city2], [city2,a_university])

The above-noted information signify the existence of a route going from Tokyo to the regional university via city1, and a route going from Tokyo to the regional university via city2. These cities will be treated as City 1 and City 2 hereinafter.

In an example such as this one, by retrieving a route by specifying a method of transportation, the route that is retrieved includes the method of transportation, which in this case is air. In this case, the assumption is made that the portion from Tokyo to City 1 is traveled by air, with the remainder of the trip being made by bus. To simplify the description, the route via City 2 will be omitted, as will illustration of the processing, to be described next, with regard to the time table database.

(3-5. Obtaining the Time Table)

When the retrieval of the route succeeds as described above, the agent user returns to the node ta, which is the travel agent 102, after which the action retrieve_tt (not shown in the drawing), which obtains the time table that corresponds to the retrieved route is executed. When this is done, this action also fails, because there is no time table database for means of transportation from City 1 to the regional university at the node ta, so that replanning is performed. As a result, uncertain knowledge is again obtained, this time to the effect that this database might exist at the tourist bureau 105, whereupon the movement and replanning such as described above are performed.

This time, however, let us assume that the database does not exist at the destination, the tourist bureau 105. In this case, replanning is performed at the tourist bureau, this time resulting in the generation of a plan that uses the uncertain knowledge that the database exists at the regional university 106. Because the regional university 106 does not support mobility (FIG. 6), the decision is made that the verification of this uncertain knowledge should be made by cooperation. As a result, the agent user cooperates with an agent at the regional university, thereby retrieving the time table of a means of transportation (bus) from City 1 to the regional university.

(3-6. Air Reservation by Cooperation)

Next, the agent user attempts to execute the action reserve_tickets. In this case, as a result of the processing up until this point, as shown in FIG. 20, reservation processing for both the airplane (P2) and the bus (P3) will be performed. Of these, because the required reservation acceptance database (ticket database) for the plane does not exist at the node ta, replanning is performed, the result being that the uncertain knowledge M4, to the effect that this exists at the two airlines airline1 and airline2 (these being hereinafter referred to as Airline 1 and Airline 2.

Because it is possible to obtain the knowledge that the computers of the two airline companies are connected by means of communication circuit having high reliability, rather then move the agent, this time the contract net protocol procedure is executed. Using this contract net protocol, the agent user sends the following task announcement message to the agents on the computers of the two airlines 1 and 2 (103 and 104).

task_announce(
    plan(ticket_reserved(tokyo,city1)),
    cost(price))

This task announcement message means that bids are being entertained for ticket reservations from Tokyo to City 1, based on the evaluation criterion of price.

Upon receiving the above-noted task announcement message, the agents of the airlines perform planning with regard to the goal of ticket_reserved(tokyo,city1), the result being that the plan reserve_ticket(tokyo,city1)

is generated by both agents. Next, the agents of Airline 1 and Airline 2 perform a cost calculation with regard to the generated plans. The cost that is calculated is the price, this being the ticket price, that is included in the task announcement message. As a result of this calculation, let us assume that the ticket prices of the two airlines were 20,000 Yen and 23,000 Yen, respectively.

In this case, the agents of airline 1 and Airline 2 return the above-noted calculation results to the agent currently operating at the travel agent 102, in the form of a bidding message such as shown below.

bid(bidder(airline1_ag1),
    reserve_ticket(tokyo,city1),
    cost(20000))
bid(bidder(airline2_ag1),
    reserve_ticket(tokyo,city1),
    cost(23000))

The agent user, upon receiving the above-noted bidding messages, compares the bidded costs, and selects the lower cost. That is, the agent airline1_ag1 of Airline 1 is awarded the task. Then the agent user sends a knockdown message, which represents the awarding of the task, to the selected agent airline1_ag1 of Airline 1, and sends a no-knockdown message, which represents non-awarding of the task, to the agent airline2.ag1 of Airline 2, which was not selected in the bidding.

(3-7. Bus Reservation)

In this manner, when the processing P2 for the air reservation is completed, the agent user performs one more processing, this being required for the goal of resolve_goal(plan_and_reserve_tickets( . . . ))

and representing the bus reservation processing P3.

The bus reservation processing P3 requires the existence of a bus reservation acceptance database (DB) as a precondition. Because this reservation acceptance database does not exist at the node ta, at which the agent user currently is located, after a failed execution, replanning will be performed, the result of which is the obtaining of a plan that uses the uncertain knowledge that the bus reservation acceptance database might exist at the tourist bureau 105.

Because, as noted above, the tourist bureau 105 satisfies the condition for movement, the agent user is moved to the tourist bureau 105 and searches for the bus reservation acceptance database but cannot find it. Next, a plan is obtained that uses the uncertain knowledge that the bus reservation acceptance database might exist at the regional university 106.

At this point, because the regional university 106 does not support mobility, the contract net protocol is used to perform the processing P3 for making the bus reservation, thereby achieving the ultimate goal of completing the reservations. The overall flow from the original uncertain knowledge to the point at which the final goal is reached is shown in FIG. 20.

4. Effect

As described above, in this embodiment information with regard to whether each of the platforms supports mobile agents is prepared in the form of the platform profile 52. Then, when an agent is to use a resource at a different platform, a decision as to whether the agent is to be moved to the other platform or is to request processing (cooperation) with respect to an agent at the other platform is easily made, based on this platform profile 52.

For example, when an agent is to use a resource of another platform, if the circuit connecting to that platform has a low reliability, it is desirable that the agent be moved to that platform. If that platform does not support a mobile agent, however, as can be ascertained from the platform profile 52, there is no need to attempt to move the agent. Instead, the judgment can be made that cooperation should be done with an agent at the other platform. To perform cooperation between a plurality of agents, a known technology for inter-agent cooperation, for example a contract net protocol or blackboard function is used.

In this embodiment, for each agent information with regard to whether the agent is a mobile agent that has the ability to move between platforms or is a stationary agent without the ability to move is prepared in the form of the agent attributes 53. By doing this, when an agent is to use a resource at another platform, the decision of whether to move the agent to the other platform or make a request for processing (cooperation) with respect to an agent at the other platform can be easily made, based on the agent attributes.

In this embodiment, in particular when an agent is to use a resource of another platform, the decision is made based on both the above platform profile 52 and agent attributes 53. For example, if both the agent and the platform support movement, the agent is moved. However, if either one does not support movement, cooperation is done. By doing this, it is easy to make integrated use of mobile agents having the ability to move and stationary agents.

Furthermore, in this embodiment it is possible by planning to flexibly accommodate unexpected changes in the network. Even if planning causes an agent plan to change, regardless of which agent is using the resources of which platform, it is possible to decide, based on the platform profile 52 and agent attributes 53, whether to perform movement or cooperation. In this manner, by making selective use of movement and cooperation, the efficiency of using agents in performing information processing in a distributed network environment is improved. Because planning can be used to accommodate changes in the network as agent movement and cooperation are effectively linked together, it is possible to perform effective information processing in an open-type network.

In this embodiment, even if an exception occurs, such as when movement of an agent between platforms fails, by appropriately handling such exceptions, the smooth processing of information is achieved. In this embodiment in particular, the type of handling to be done in the case of various types of exceptions is expressed in the exception description 54, so that by rewriting this exception description it is possible to easily change the method of exception handling.

Additionally in this embodiment, with regard to exceptions which often occur at the time of movement, these being such situations as failure of communication with the movement destination, invalid specification of the movement destination, lack of support of the destination for mobile agents, and insufficient resources at the destination, by expressing the handling to be done for at least one of these situations in the exception description 54, it is possible to achieve effective handling of exceptions.

In particular in this embodiment, information with regard to which communication circuits have low reliability is prepared as part of the platform profile, for example, beforehand, this being used to decide on handling to be done in the case in which communication is cut off when an attempt is made to move an agent via such a communication circuit. By doing this, it is possible to lessen the chance of faulty operation and failures even in the case of a low-reliability communication circuit which experiences a break in communication.

Specifically, in this embodiment when there is a break in communication for the purpose of moving an agent, communication is retried after waiting some time. For this reason, even if the reliability of a communication circuit is low, the chance of it being possible to move agent information during a period in which the line status is good is increased.

Additionally, in this embodiment the resources of a platform, such as knowledge that is used in planning, are divided and managed by an individual field, based on the purpose of the information processing and application field of the knowledge. For this reason, an agent in a given field need not access knowledge that is not related to its own purpose, thereby enabling efficient planning.

Additionally, in this embodiment urgent information, such as unpredicted changes in the network is, for example, written into a higher hierarchical layer of a blackboard, so that it can interrupt the normal operation of an agent, thereby enabling control of the agent operation to accommodate such changes.

5. Variations

Variations of the above-noted embodiment include other examples shown below.

First, the present invention can, of course, be applied to problems other than the ticket reservation problem.

The platform profile 52 (FIG. 6), the agent attributes 53 (FIG. 7), and the exception description 54 (FIG. 8 and FIG. 9) that were shown are merely examples of format and contents. It is, of course, possible to use other formats, and to freely change the items to be included in this information. Also, it is possible for example to store the exception description together with the agent attributes or to store the exception description with correspondence established to such information. In the same manner, it is also possible to make information with regard to the communication circuit reliability not be part of the exception description, but rather store this information as independent information, or to store it as part of the platform profile.

In the above-described embodiment, the platform profile, agent attributes, and exception description and the like are stored in the knowledge storage section of each platform. This is merely an example representing how such type of information is managed. Such type of information can also be implemented as information held by the agent, so that when an agent is transferred to another platform in order to move it to another platform, this information can be transferred together with the agent.

The configuration for handling exceptions, including the exception handling section and exception description and the time-out detection section need not be provided. It is possible that the contents of the exception description are freely established, without regard to the example shown for the above-described embodiment.

Similarly, it is not need to provide a plurality of fields in each platform, and the blackboard section and the blackboard management section need not be provided.

2. Second Embodiment

1. Configuration 1.2 Overall Configuration

Figure 22:
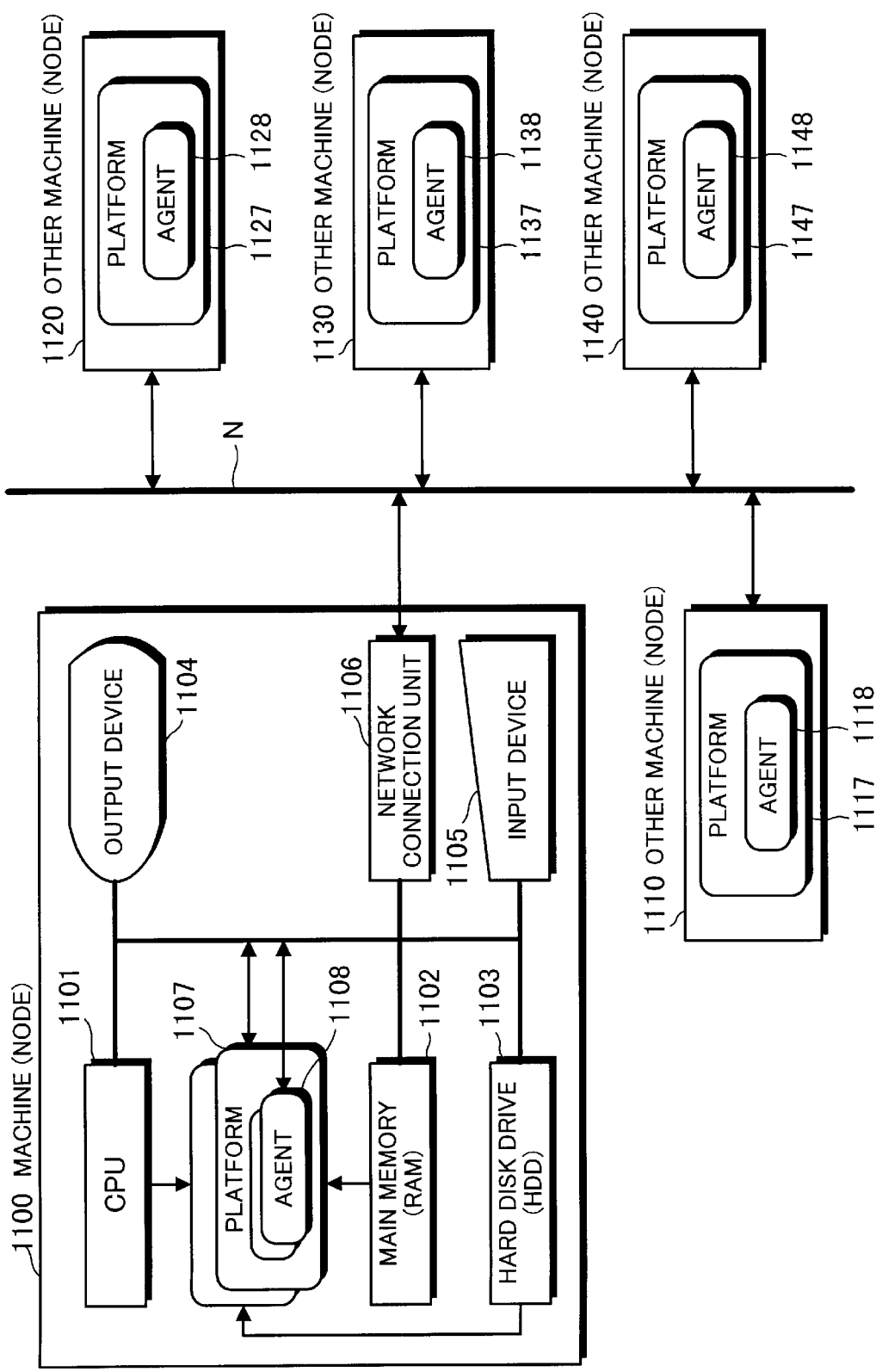
FIG. 22 is a block diagram that shows the overall configuration of the second embodiment of the present invention.

First, FIG. 22 is a block diagram that shows the overall configuration of an agent system according to the second embodiment of the present invention. Specifically, this embodiment of agent system, as shown in this drawing, is a computer network in which a plurality of computers (which will be simply called machines) 1100, 1110, 1120, 1130, and 1140 are connected by a network N. An example of a typical machine is the machine 1100, the hardware configuration of which is shown in the FIG. 22.

More specifically, the machine 1100 hardware is formed by a CPU 1101, a main memory 1102, such as a RAM, a hard disk drive 1103 that serves as auxiliary memory, an output device 1104 such as a CRT display or a printer, an input device 1105 such as a keyboard or mouse, a network connection device 1106, and a bus that makes connection between the above-noted hardware elements, the machine 1100 being connected to the network N via this network connection device 1106. The machines 1110 through 1140 have the same type of hardware configuration as the machine 1100.

On a single physical machine, it is possible to have a plurality of nodes, which are the logical units for network management. In this example, however, both nodes and machines will be referred to as machines. At least one platform 1107 is set at each machine 1100, this platform 1107 being the location for action of an agent 1108, and providing the computer resources and services required for agent operation.

A platform 1107 as noted above exists as data on the hard disk drive 1103 before activating and, when activated is loaded into the main memory 1102. The operation of a platform 1107 that has been launched and loaded into the main memory 1102 is implemented by the execution of program code, which is description of platform operation, by the CPU 1101. At the other machines 1110, 1120, 1130, and 1140 as well, in the same manner are set the platforms 1117, 1127, 1137, and 1147, respectively, the description to follow taking the platform 1107 as being representative of the platforms 1107, 1127, 1137, and 1147.

Each of the platforms 1107, as will be described later, has a platform profile that expresses various attributes of the platform as information. This information is held on the hard disk drive 1103 that the platform 1107 uses, and has a structure that will be described later. The configuration, described below, for the purpose of achieving operation of the platform is provided within the platform.

(1-2. Specific Platform Configuration)

Figure 23:
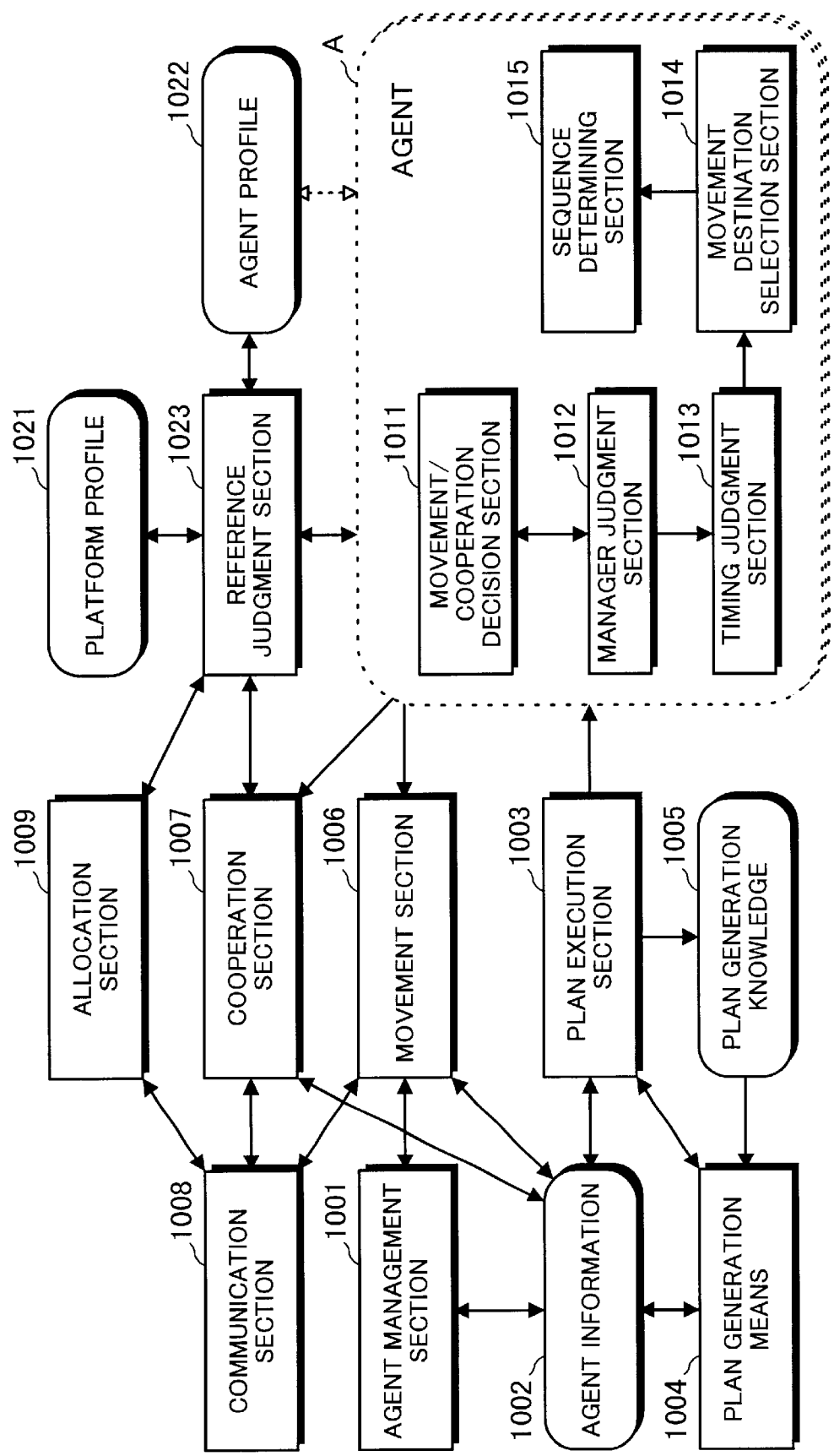
FIG. 23 is a functional block diagram that shows a specific configuration of a platform in the second embodiment of the present invention.

FIG. 23 is a functional block diagram that shows the configuration of the platform, as represented by platform 1107, and an agent that operates thereon. In this drawing, the agent is represented by the symbol A The platform, as shown in FIG. 23, has an agent management section 1001, agent information 1002, a plan execution section 1003, a planning section 1004, and a planning knowledge 1005, which serves as means for operation of the agent on the platform.

Of the above-noted elements, the agent management section 1001 is the section that performs such management functions as creating a new agent, registering an agent and monitoring the agent, allocating resources such as memory and deleting an agent. The agent information 1002 is information that is required for the operation of each of the agents, specific examples of this agent information 1002 being a plan and internal status. Of these types of information, the plan is the description of just how an agent is to act in various cases, and the "internal status" is a general term used to refer to a variety of information, such as variables, stacks, pointers, and buffers and the like which are used at the time of execution of a plan.

The plan execution section 1003 is the section that executes a plan such as noted above, thereby causing the agent A to exist and act at the platform. The planning section 1004 is the section that generates a plan such as noted above when an agent is created, and subsequently regenerates the plan in response to situations.

The planning knowledge 1005 is knowledge that is used in plan creation, specific examples of this being action knowledge and local knowledge. Of theses type of planning knowledge, action knowledge is the expression of what types of action there are that serve as components that make up a plan, while local knowledge is knowledge with regard to facts such as what files and functions exist at which platforms in the network.

The local knowledge includes uncertain knowledge. This uncertain knowledge is knowledge that requires some type of processing at a platform that is outside the platform at which the agent is generated, this being for example knowledge at some platform F1 to the effect that a desired file "might exist!' at a some other platform F2. When a plan that is generated that uses such uncertain knowledge is executed, in order to verify the uncertain knowledge, it is necessary to perform processing at such another platform.

A platform also has a movement section 1006, a cooperation section 1007, and a communication section 1008. Of these, the movement section 1006 is a means for moving an agent between platforms. Specifically, this is the section that performs such tasks as giving an instruction to the agent management section 1001 to delete an agent after having transferred the agent information 1002 to another platform, and upon receiving agent information 1002 from another platform, giving instruction to the agent management section 1001 to use that agent information 1002 to create an agent, and start the agent operation.

The cooperation section 1007 is a means for causing cooperation between a plurality of agents, this, element being particularly effective in causing cooperation between a plurality of agents on different platforms. Specifically, the cooperation section 1007, in accordance with a contract net protocol or the like, causes a request to be made to an agent on another platform from an agent on the local platform and can, in reverse, receive and handle a request for a task received by a local agent from an agent on another platform. The communication section 1008, based on instructions from, for example, the movement section 1006 and the cooperation section 1007, performs communication such as data transfer between platforms over a network circuit.

(1-3. Agent Configuration)

An agent is the unit that makes up the system, and is a collection of executable program code and data that is used in the execution thereof, this being in particular a collection of plans and internal status, which enables autonomous operation in response to conditions. This agent can be stored as data in a storage apparatus, such as a hard disk drive, before being generated and launched, in which case it is loaded into memory when created and launched. The operation of such an agent that has been created and loaded into memory is implemented by processing in the form of the CPU executing the program code that makes up the agent.

Each of the agents has an agent profile, which is information that expresses various attributes of the agent. This information is, held within the agent or held within a platform that is linked to the agent, and has a data structure that will be described later. The configuration for the purpose of implementing agent operation is provided, as noted below, within the agent.

Specifically, an agent A is created by the agent management section 1001 at a platform and this agent A operates by having the execution section 1003 execute a plan, the agent A itself having a movement/cooperation judgment section 1011, a manager judgment section 1012, a timing judgment section 1013, a movement destination selection section 1014, and a sequence-determining section 1015.

Of the above-noted elements, the movement/cooperation judgment section 1011 is a means that, in a case in which processing at a platform that is different than the platform at which agent A current exists is required, makes a decision as to whether to move the agent to the other platform, or to perform cooperation with an agent on the other platform. The manager judgment section 1012 is a means for making a judgment of whether the means for movement of the agent A is to be mainly managed by agent A or by the platform.

The timing judgment section 1013 is a means for making a judgment when the agent A is moved to another platform as to whether or not to move the agent immediately. The movement destination selection section 1014 is a means that, when there are a plurality of candidates for platform movement destination, selects the platform to which movement will be made. The sequence-determining section 1015 is a means that, when an attempt is made to sequentially move an agent to a plurality of platforms, determines the sequence of the movements to be made from platform to platform.

(1-4. Other Configuration Elements of the Platform)

The platform also has an allocation section 1009, a platform profile 1021, an agent profile 1022 as noted above, and a referencing judgment section 1023. Of these elements, the allocation section 1009 is the part that, with regard to each platform in the agent system, allocates agents by causing them to move in response to situations.

Specifically, the allocation section 1009 performs a judgment as to whether or not to move an agent from the local platform to another platform, or whether to move an agent at another platform to the local platform, this judgment being made in response to the situations of each platform and network circuit, the configuration of this section being such that, as a result of this judgment, instructions are issued for agent movement.

The platform profile 1021 expresses various information that is used as the basis for judgments regarding movement, for each of the platforms. This information will be described in detail later, and includes the following items.

a) whether or not there is a function to cause agent movement b) whether the reliability of a network circuit related to the platform is high or low c) whether it is possible to have an agent exist indefinitely d) what types of actions are recognized for an agent e) what types of programming languages can be executed f) whether the platform will mainly manage processing for agent movement g) what types and quantities of resources are to be provided h) what types of agents exist i) what services are to be provided and, j) from when until when is action to be done The agent profile 1022, for each agent, expresses information that is used as the basis for judgments regarding agent movement. This information will be described in detail later, and includes the following items.

k) whether the agent has the ability to move between platforms l) whether processing for agent movement is to be done mainly by the agent m) what types and quantities of resources are required by the agent n) from when until when is action to be done o) in what programming language the agent action is to be described and p) what types of services are required by the agent A variety of methods and locations can be envisioned for the storage of the above-noted platform profile 1021 and agent profile 1022. Atypical method is to make each of the agent profiles for each agent part of each of the agents. The platform profile 1021 with regard to the platforms could be stored at each of the platforms. However, the above-noted platform profile 1021 and agent profile 1022 can also be stored in a centralized manner beforehand at a specific platform, or at a number of specific platforms.

The access judgment section 1023 is an access judgment means for making a judgment as to how the above-noted profile 1021 is to be accessed. Specifically, this section makes a judgment as to how to make a request for access to another agent, based on the platform load, on whether or not an agent has permission to reference the profile, and the status of a network circuit to the platform at which the target profile exists and, in a case in which an access request is received via the cooperation section 1007 from another platform or an agent of another platform, based on the degree of load and the like, this section makes a judgment as to whether to check anew for the latest information from a profile, or to reply from what is already known from the previous access, for example.

(1-5. Platform Profile Data Structure)

It can be envisioned that the data structure of the platform profile 1021 has the following items.

a) Mobility Support

This is the expression of whether or not the individual platforms support a mobile agent, which means support of movement of an agent between platforms, this being referred to as mobility support a. This item can be described by an appropriate preestablished keyword such as "mobility-support" that is followed by a value of Yes or No as shown below, making it possible to set the attribute as the value of an attribute with that name.

mobility-support Yes/No b) Reliability

This is the expression of whether the reliability of a network circuit used for exchange of information between platforms or a part thereof is high or low, and is referred to as reliability b. This item can be described by an appropriate preestablished keyword such as "network-reliability" that is followed by the value of High or Low as shown below, making it possible to set the attribute as the value of an attribute with that name.

network-reliability High/Low c) Persistency

This is the expression of whether or not it is possible for each platform to cause an agent to persist indefinitely, and is referred to as persistency c. For example, with regard to a small terminal such as a PDA (personal digital assistant), because its very nature means that the power will not remain on at all times and also because of a Imitation in free space on a hard disk drive or in main memory, it cannot be expected that it would be possible to cause an agent to persist indefinitely. This item can be described by an appropriate preestablished keyword such as "persistency" that is followed by the value of Yes or No as shown below, making it possible to set the attribute as the value of an attribute with that name.

persistency Yes/No d) Permission List

This is the expression, for each agent, of whether or not each individual operation such as reading and writing of data and execution of a plan is permitted or not by the individual platforms, and is referred to as the permission d. This item can be described by an appropriate preestablished keyword such as "permission" that is followed by one or more agent names and the individual permissions for various operations for each agent, as shown below.

permission
   agentname1, write permission, read permission, execution permission
   agentname2, write permission, read permission, execute permission e) Platform Language List This is a list of languages and version of languages that can be used at the indivdual platforms, and referred to as the platform language list e. It can be envisioned that the languages that can be used at a platform would be a range, such as "Java, version 1.1 or later" or "VC++, version 5.0 or later." This item can be described by an appropriate preestablished keyword such as "language/version" that is followed by one or more languages and version as shown in the example below.

language/version
   language type 1, version
   language type 2, version
   . . .

f) Platform Mobility Support

This is the expression of whether or not, at each of the platforms, it is possible to mainly perform a series of processing, that is, a protocol, for the purpose of moving an agent between platforms, this being referred to as the platform mobility support f. This item can be described by an appropriate preestablished keyword such as "mobility-protocol-support" that is followed by the value of Yes or No as shown below, making it possible to set the attribute as the value of an attribute with that name.

mobility-protocol-support Yes/No g) Provided Resource List

This is a list of the resources types and amounts thereof provided by each of the platforms to an agent and the amount currently being provided, and is referred to as the provided resource list g. Types of resources that can be envisioned include CPU time slices in a multitask system and such physical resources as hard disk capacity and memory capacity. This item can be described by an appropriate pre-established keyword such as "resources" that is followed by one or more resource names, the maximum amount thereof that is provided, and the amount that can currently be provided, as shown in the example below.

resources
   resource name1, amount, amount that currently be provided
   resource name2, amount, amount that currently be provided h) Agent List This is a list of agents that exist at each of the platforms, these being the currently active agents, this being referred to as the agent list h. This item can be described by an appropriate preestablished keyword such as "agents" that is followed by one or more agent names and agent types, as shown in the example below.

agents
   agentname1, type
   agentname2, type
   . . .

i) Provided Service List

This is a list that represents, for each individual platform, the services that the platform can provide to an agent, and is referred to as the provided service list i. Services that are provided by a platform include such software-like function as, for example, radio communication, planning, and access to a database. This item can be described by an appropriate pre-established keyword such as "services" that is followed by a list of the names of services, such as shown in the example below.

services servicename1, servicename2, . . .

j) Platform Schedule

This represents the time range in which each individual platform operates, and establishes how long an agent on the platform, in accordance with this schedule, can continue to exist, thereby establishing the period of its existence, its duration, and the time of it being stopped, for example. Items that are affected by the time period during which a platform operates or the duration thereof include lifetime, maintenance tin, and the period of time during which power is supplied. This item is referred to as the platform schedule j, and can be described by an appropriate keyword such as "schedule" that is followed by a pair of times that define the starting and ending times of that platform, such as shown in the example below schedule
   starting time, ending time
   starting time, ending time
   . . .

(1-6. Agent Profile Data Structure)

It can be envisioned that the data structure of the platform profile 1022 has the following items.

k) Mobility Possibility

This represents whether or not an agent itself has a function for moving between platforms, and is referred to as the mobility possibility k. This item can be described by an appropriate pre-established keyword such a "mobility-possibility" that is followed by the value of Yes or No, making it possible to set the attribute as the value of an attribute with that name.

mobility-possibility Yes/No

1) Agent Mobility Support

This represents whether or not an agent has a function whereby the agent can itself mainly perform a procedure of movement between platforms, this being referred to as the agent mobility support 1. An example of an agent performing independent management of movement is communication and data copying required for movement of the agent and procedure monitoring by the agent, the platform merely intervening onto the network only mechanically for these operations. This item can be described by an appropriate pre-established keyword such as "mobility-protocol-support" that is followed by the value of Yes or No, as shown in the example below, making it possible to set the attribute as the value of an attribute with that name.

mobility-protocol-support Yes/No m) Required Resource List

This represents the types and amounts of resource that an agent requires, and is referred to as the required resource list m. This item can be described by an appropriate preestablished keyword such as "resources" that is followed by one or more resource names and the amount of each resource that is required, as shown in the example below.

resources
    resource name1, required amount
    resource name2, required amount
    . . .

n) Agent Schedule

This represents from when until when an agent will be operating, and establishes the period of duration and stopping time of the agent, this being referred to as the agent schedule n. This type of agent duration corresponds to the life of the agent, and can be implemented by processing such as monitoring a pre-established ending time using a timer and, when the time is reached, having the agent automatically deleted, or having it deleted from outside. This item can be described by an appropriate keyword such as "schedule" that is followed by the starting and ending times for the agent, as shown in the example below.

schedule
    starting time, ending time
    starting time, ending time
    . . .

o) Agent Language Version

This is a list of the language and version of language that is used to describe the program code that forms the agent, and is referred to as the agent language version o. This item can be described by an appropriate pre-established keyword such as "Language/version" that is followed by the language and version, such as shown in the example below.

language/version language type, version p) Required Service List

This is a list of what services are required for agent action, and is referred to as required service list p. This item can be described by an appropriate preestablished keyword such as "services" that is followed by a list of required services, such as shown in the example below.

services servicename1, servicename2, . . .

The platform profile 1021 and agent profile 1022, with data structured as described above, are stored as data in the formats shown in FIG. 24 and FIG. 25, for example, in main memory or in an auxiliary memory such as a hard disk drive at each individual platform. The platform profile example shown in FIG. 24 and the agent profile example shown in FIG. 25, in addition to the above-described data items each have an additional identifier such as a platform name, and items with regard to what type of protocol is to be used for movement or cooperation. The specific data structure, it should be noted, can be established freely in the embodiment of the present invention.

2. Action

Figure 26:
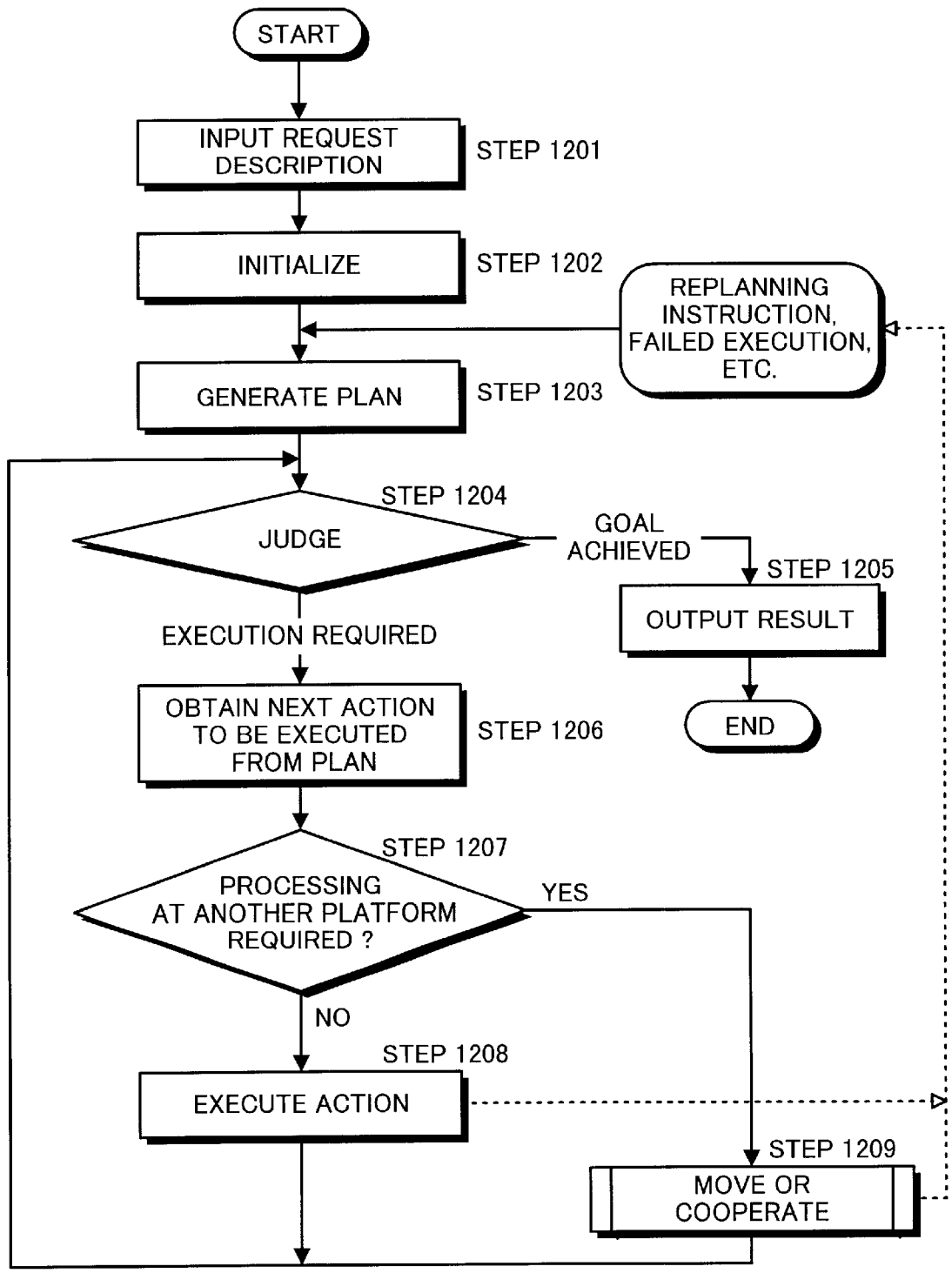
FIG. 26 is a flowchart that shows the processing procedure in the second embodiment of the present invention.

An embodiment of the present invention configured as described above operates in the following manner. FIG. 26 is a flowchart that shows the processing procedure of this embodiment.

(2-1. Input of Request and Initialization)

First, a user inputs request description into the system (step 1201). This request description is the status to be achieved as a result of information processing, described in a pre-established format, and this input request description is converted to a goal. This goal represents the status that is to be achieved by information processing by an agent, in a form that can be processed by an agent or the planning section 1004.

Next, as initialization processing, the agent management section 1001 of the platform performs such processing as creating an agent to be used in the achievement of the goal, registering the created goal into the agent list h of the platform profile 1021, setting the agent profile 1022 of the created agent, making prescribed initialization settings of the internal status of the agent, and allocating resources to the agent (step 1202).

(2-2. Planning)

When an agent is created as noted above, the planning section 1004 generates a plan, that is, performs planning for the purpose of achieving the converted goal (step 1203). At this point, the platform knowledge 1005 includes information as to what operations are possible by the agent, this information being action knowledge. The planning section 1004 performs planning by the procedure shown in FIG. 5, similar to the planning section 2 of the agent system described with regard to the first embodiment.

(2-3. Plan Execution)

When the planning procedure (step 1203 in FIG. 26) as described above is completed, the plan execution section 1003 executes the generated plan. In the execution of the plan, actions included in the plan are extracted one at a time (step 1206) until a judgment is made that the goal has been achieved (step 1204), and in the case, for example, in which an action includes uncertain knowledge, at which processing at another platform becomes necessary, processing is executed by either moving the agent to the target platform (movement) or by requesting processing (cooperation) from an agent existing at the target platform (step 1209).

The specific procedure for this movement or cooperation will be described in detail, with reference being made to FIG. 27.

(2-4. Judgment of Whether to Use Movement or Cooperation)

Figure 27:
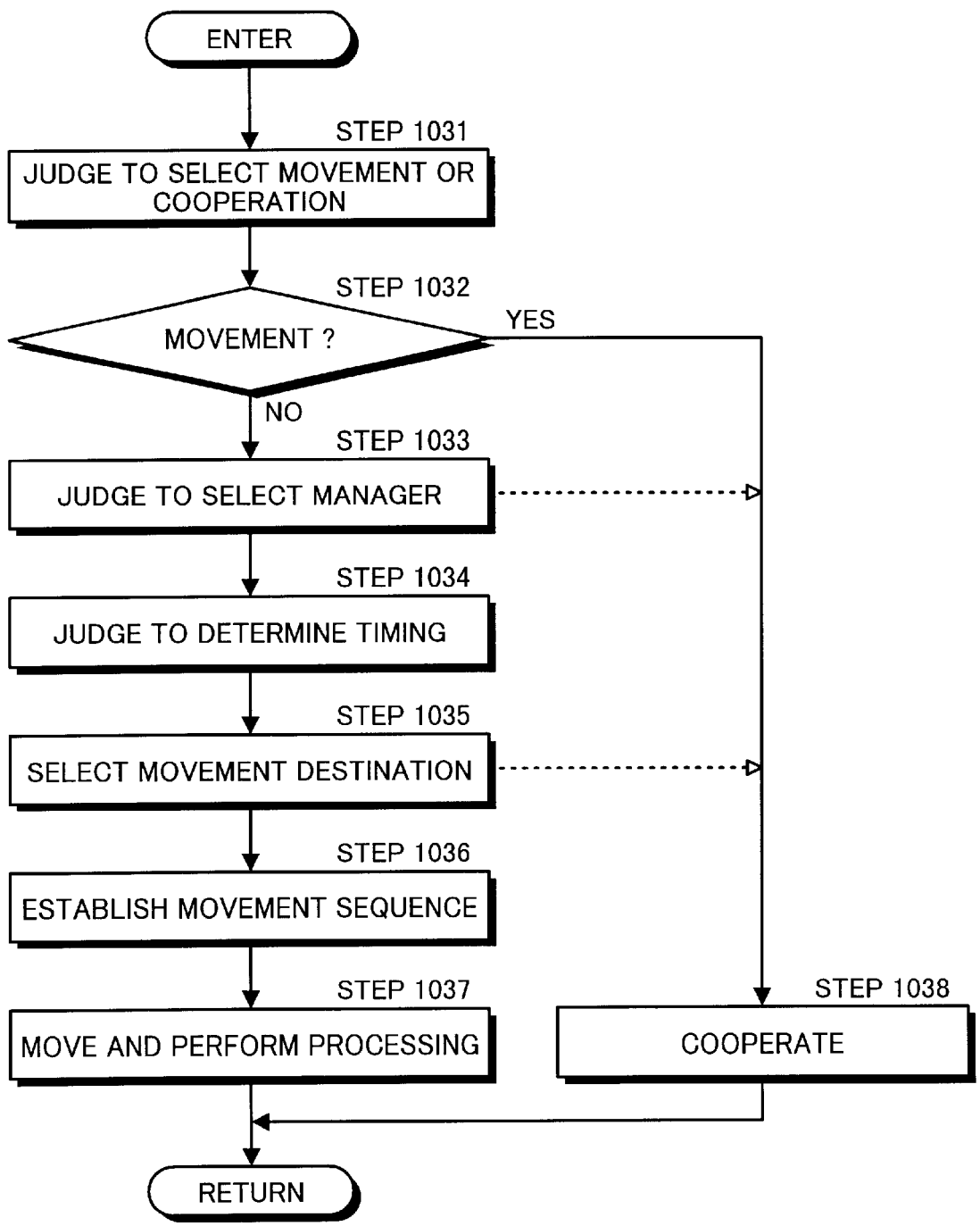
FIG. 27 is a flowchart that shows the procedure for either processing at another platform by either movement or cooperation in the second embodiment of the present invention.

In the procedure that is shown in FIG. 27, in the case in which processing is required at a platform that is different from the current platform, the movement/cooperation judgment section 1011 of the agent dynamically selects either movement or cooperation to perform the above-noted processing, based on platform profile 1021 movement support a, reliability b, and the mobility possibility k of the agent profile 1022 (step 1031).

For example, if with agent A1 at platform F1 work becomes necessary at platform F2, the movement/cooperation judgment section 1011 retrieves the mobility possibility from the agent profile 1022 to test whether or not the agent itself can be moved. Then, if the local agent is determined to not be mobile, the movement/cooperation judgment section 1011 selects cooperation (step 1032), the result being that the agent A1 performs an exchange of messages, via the cooperation section 1007, with the agent A2 at the platform F2, thereby requesting the required work (step 1038).

In the case in which the local agent was determined to be mobile, the movement/cooperation judgment section 1011 of the agent A1 further retrieves the mobile support a from the platform profile 1021 within the platform F1, thereby checking whether or not the platform F1 has a function to move an agent, that is, whether it supports a mobile agent. When it is desired to know the contents of the platform profile 1021 in this manner, it is also possible to issue an inquiry about this to the platform F1, platform F1 retrieving the platform profile 1021 and then returning the results to the agent A1.

In the case in which it is discovered that the platform F1 does not support a mobile agent, the movement/cooperation judgment section 1011 selects cooperation (step 1032), the result being that the agent A1 issues a request via the cooperation section 1007 for the required work (step 1038) to the agent A2 at the platform F2.

If, however, it is discovered that the platform F1 does support a mobile agent, the movement/cooperation judgment section 1011 of the agent A1 further retrieves the mobility support a from the platform profile 1021 that is within the platform F2, so as to check on whether or not the platform F2 supports a mobile agent. When it is desired to know the contents of the platform profile 1021 of the platform F2 in this manner, it is also possible to issue an inquiry about this to the platform F2, platform F2 retrieving the platform profile 1021 and then returning the results to the agent A1.

In the case in which it is discovered that the platform F2 does not support a mobile agent, the movement/cooperation judgment section 1011 selects cooperation (step 1032), the result being that the agent A1 issues a request via the cooperation section 1007 for the required work (step 1038) to the agent A2 at the platform F2.

If, however, it is discovered that the platform F2 does support a mobile agent, similar to the case described above, agent A1 further checks the reliability of the network circuit that connects the local platform F1 to the network and the reliability of the network circuit that connects the destination platform F2 to the network, by retrieving the reliability b from each of the platform profiles 1021.

In the case in which both reliabilities are found to be high, the movement/cooperation judgment section selects cooperation (step 1032), the result being that the agent A1 issues a request for the required work (step 1038) to the agent A2 at the platform F2, via the cooperation section 1007 of the agent A1. If both of the network circuits or one of them was discovered to have a low reliability, the movement/cooperation judgment section 1011 selects movement (step 1032), the result being that the agent A1 goes into the operation for the purpose of moving to the platform F2, and starts, for example, the manager judgment section such as described below (step 1033).

(2-5. Manager Judgment)

As described above, in the case in which the movement/cooperation judgment section 1011 judges that a movement is to be made, the manager judgment section 1012 makes a judgment as to whether the agent is to mainly manage the movement procedure or the platform is to mainly manage the movement procedure (step 1033). That is, if the agent is to manage the processing procedure sequence related to the movement, the load on the agent becomes large. If, however, the platform is to manage the movement procedure, there is a loss in freedom in agent movement, resulting in a worsening of efficiency.

For this reason, the manager judgment section 1012 makes a judgment as to whether the agent itself is to manage the progress of the movement-related procedure, or whether this management is to be left up the platform, this judgment being made dynamically, based on the platform mobility support f and the provided resource list g of the platform profile 1021 and on the agent mobility support l of the agent profile 1022.

For example, in the case in which a judgment is made to move the agent A1 at the platform F1 to the platform F2, the manager judgment section 1012 checks whether the agent itself has the capability of mainly managing a movement procedure, by retrieving the agent mobility support l of the agent profile. The manager judgment section 1012 of the agent A1 also retrieves the platform mobility support f from the platform profile 1021, thereby checking as to whether the platform F1 has the capacity to mainly manage a movement procedure.

To check the above-noted items, it is also possible to place an inquiry with respect to the platform F1 and have the platform F1 return the results of retrieval from the platform profile 1021.

In the case in which the above checking reveals that the agent A1 has a function to mainly manage movement, but that the platform F1 does not have a function that mainly manages a movement, the manager judgment section 1012 selects movement under management of the agent. It on the other hand, the check reveals that the platform F1 has a function for mainly managing movement but that the agent A1 does not have a function for mainly managing movement, the manager judgment section 1012 selects movement under management of the platform. In this case, the agent A1 makes a request to the platform F1 for the movement procedure, the platform F1 taking over, a selection being then made of movement by normal movement and clone movement, as will be described later, this movement being then executed.

In the case in which both the agent A1 and the platform F1 have a function to mainly manage movement, the manager judgment section 1012 of the agent A1 retrieves the platform profile 1021 of the platform F1 and checks the resource usage load) at the platform F1. When this is done, it is also possible to send an inquiry about the load to the platform F1 and have the platform F1 retrieve the platform profile 1021, after which the results are returned to the agent A1.

In the case in which the resource usage, that is, the load of platform F1 is high, the manager judgment section 1012 selects movement under independent agent management, the result being that the agent A1 takes over, a selection being then made of movement by normal movement and clone movement, as will be described later, this movement being then executed.

If the load at the platform F1 is low, the manager judgment section 1012 selects movement under independent management by the platform, the result being that the agent A1 issues a request for the movement procedure to the platform F1. In this case, the platform F1 takes over, a selection being then made of movement by normal movement and clone movement, as will be described later, this movement being then executed.

If neither the agent A1 nor the platform F1 have a function to manage movement, the manager judgment section 1012 makes the judgment that movement is not possible. In this case, the agent A1 will study another action, this other action being, for example, requesting work of another agent by means of cooperation (step 1038), or ending the achievement of the goal and interrupting work.

(2-6. Timing Judgment)

In the case of movement to another platform, it is necessary to make a judgment as to whether the agent is to be moved immediately or after waiting for some time. For example, there are cases in which the load at the destination platform is high, in which the reliability of a network circuit that makes connection to the destination platform is low, and in which, in consideration of the amount of resources the agent itself will use, it would be better to wait some time before moving. On the other hand, there are cases in which it is better to move immediately, depending upon the load at the current platform and the persistence time period thereof.

For this reason, in a case in which an agent is to be moved to another platform, the timing judgment section 1013 dynamically makes a judgment of whether movement is to be done immediately or after waiting some time, this judgment being made based on the reliability b, persistency c, provided resource list g, and platform schedule j or the platform profile 1021 and on the agent schedule n, for example, of the agent profile 1022 (step 1034).

For example, in the case in which the agent A1 at the platform F1 is to be moved to the platform F2, the timing judgment section 1013 makes the following judgment with regard to the original platform, platform F1. Specifically, the timing judgment section 1013 retrieves the agent profile 1022 in order to check the agent schedule n, which is the representation of how long persistence is of the agent itself is possible. If the result is that the persistence deadline in the agent schedule n is close at hand, the timing judgment section 1013 make the judgment to perform the move immediately, the result being that the agent A1 starts processing for moving immediately.

In the case in which the persistence deadline of the agent A1 is not soon, the timing judgment section 1013 of the agent A1 retrieves the platform profile 1021 of the platform F1, in order to check the persistency c, which represents whether or not the agent can exist indefinitely at the platform F1, and the platform schedule j, which represents how long the platform itself can exist. With regard to these items, it is also possible to issue an inquiry from the timing judgment section 1013 of the agent A1 to the platform F1, and to have the platform F1 retrieve the platform profile 1021 and return the results to the agent A1.

If as a result of the above checking it is discovered, based on the persistency c, that it is not possible to remain active at the platform F1 indefinitely, or if it is discovered, based on the platform schedule, that the deadline for the existence of the platform F1 is approaching, the timing judgment section 1013 makes the judgment to move immediately, the result being that the agent A1 starts processing for movement immediately.

In the above-noted processing that is related to the location before the move, in the case in which a judgment is not made to move immediately, the timing judgment section 1013 of the agent A1 then performs the following type of judgment with regard to the destination platform F2. Specifically, the timing judgment section 1013 retrieves the platform profile 1021 of the platform F2 so as to check whether it would be possible to exist indefinitely in the case in which it moved to the platform F2. For this item, it is also possible for the platform F2 to first retrieve the platform profile 1021 and then return the results to the agent A1.

As a result, based platform schedule j, if its own duration at the destination platform is close to reaching its end, the timing judgment section 1013 makes the judgment that immediate movement is to be done, the result being that the agent start processing for immediate movement.

In the case in which the duration is not near its end, the timing judgment section 1013 of the agent A1 retrieves the platform profiles 1021 for each of platform F1 and platform F2, thereby checking the network reliablity b, the provided resource list g, which represents the type and amount of resources provided by the platform and the currently used type and amount of resources. With regard to these items it is also possible to make an inquiry to the platforms F1 and 12, whereupon platforms F1 and F2 retrieve the platform profiles 1021, the results being returned to the agent A1.

As a result of the above, in the case in which the reliability b of both platform F1 and platform F2 is low, or the case in which, based on the provided resource list g, it is discovered that the resources at the current platform F1 are greater than the resources at the destination, platform F2, the timing judgment section 1013 makes the judgment to not move to the platform F2 and thereby remain at the platform F1 . In this case, before starting processing for moving, the agent A1 waits for a given period of time. If, on the other hand, either the reliability of both platform F1 and platform F2 is high or, based on the provided resource list g, it is discovered that the resources at the current platform F1 are not greater than at the destination, platform F2, the timing judgment section 1013 makes the judgment to move immediately, the result being that the agent A1 starts processing for movement immediately.

(2-7. Destination Selection)

In the case in which there is a plurality of destination candidates for movement, it is necessary to select one destination, based on the load on and resources and services at of each of the platforms, on whether or not operation is possible at the destination, whether or not permission will be granted, the status of the network circuits up to that point, the persistency at the destination, and other factors.

That is, when there is a plurality of destination platform candidates, the movement destination selection section 1014, based on such factors as the reliability b, persistency c, permission list d, platform language list e, provided resource list g, provided service list i, and platform schedule of each of the candidates, selects the movement destination platform (step 1035). With regard to these items, it is also possible, in addition to the absolute minmum requirements, to apply importance weighting, and to make the judgment in the sequence of decreasing importance weights.

For example, in the case of the agent A1 at the platform F1, in the case in which the possible candidates for movement are platforms F2 and F3, the movement destination selection section 1014, with regard to both of the platforms F2 and F3, retrieves the platform profile 1021, thereby checking the permission list d, which represents the types of actions recognized for the agent, the platform language list, which represents the languages and versions thereof supported, and the provided service list i, which represents the types of services provided.

With regard to the above-noted items, it is also possible to issue an inquiry to platforms F2 and F3, thereby having these platforms F2 and F3 retrieve their own platform profiles, the results being returned to the agent A1.

The movement destination selection section 1014, in the same manner, also performs a check with regard to the platforms F2 and F3, of the network reliability b, the persistence c, which represents whether the agent can exist indefinitely, the provided resource list g, which represents the maximum resources that can be provided and the currently provided resources, and the platform schedule, which expresses how low the platform can exist.

In this manner, as a result of various checks performed as noted above if, based on the permission list d, the platform does not grant permission for operation of the agent A1 thereon, or if the platform language list e for the platform does not satisfy the required conditions for the agent A1, that is, if it is not possible execute the language and version in which the agent actions are described at the platform, the movement destination selection section 1014 removes that platform from the movement destination candidates. The language and version in which the agent actions are described can be ascertained by referencing the agent language version o in the agent profile 1022.

The movement destination selection section 1014 removes the platform from the movement candidates also when, based on the provided service list i a judgment is made that the platform does not provide service that is required by the agent A1. When this is done, the type of service required by the agent can be ascertained by referencing the required service list p of the agent profile 1022.

In the case in which a platform is removed from the movement destination candidates in the above-noted manner, there are no longer any movement destination candidates, the movement destination selection section 1014 makes the judgment that movement is not possible, the result being that agent A1 studies cooperation (step 1038) or another action.

Next, the movement destination selection section 1014 selects the most suitable platform from the remaining platforms. Specifically, for example, a comparison of the reliability b is made between platforms, 1 point being given in the case in which the reliability is high and with regard to persistency, 1 point is given in the case in which continued existence is possible at a platform. In the same manner, 1 point is given, based on a comparison of provided resource lists between the platforms, for richness of resources and, with regard to the platform schedule j, a comparison is made between platforms, and 1 point is given for the longest duration. The platform with the most points is then selected as the movement destination.

(2-8. Establishment of Sequence)

In the case in which it is desired to move through a plurality of platforms in a sequence, it is necessary to establish the most suitable sequence, based on the platform loads and reliability of the network circuits to the platform. For this reason, if it is desired to move in sequence to a plurality of platforms, the sequence determining section 1015 of the agent, based on such information as the reliability b, persistency c, permission list d, platform language list e, provided resource list g, provided service list i, and platform schedule j for each of the movement destination platforms, determines the sequence of movement to each of the destination platforms.

For example, with regard to the agent A1 at the platform F1, in sequentially moving to the movement destination platforms F2 and F3, the sequence determining section 1015 of the agent A1 retrieves the platform profiles 1021 of platforms F2 and F3, thereby checking the permission list d, platform language list e, provided service list i, reliability b, persistency c, provided resource list g and platform schedules of these platforms. With regard to the above-noted items, it is also possible to issue an inquiry to the platforms F2 and F3, so as to have them retrieve their own platform profiles 1021, the results being returned to the agent A1.

As a result of above-noted checks if for example it is determined that the platforms F2 and F3 do not grant permission to agent A1 to operation thereon, the sequence determining section 1015 makes the judgment that a determination of the sequence is not possible.

If, based on the platform language list e, a determination is made that the movement destination platforms F2 and F3 do not satisfy the required conditions of the agent A1, that is, if it is not possible to execute the language and version thereof in which the actions of the agent A1 is described, or if, based on the provided service list i, a determination is made that platforms F2 and F3 do not provide the service that is required by the agent A1, the judgment will be made that a determination of the sequence is not possible. In this case, the agent A1 would study another action, in which case the other action could be a re-selection of the platforms that are the candidates for movement destinations.

The language and version and service required by the agent can be judged by referencing the agent language version o and the required service list p of the agent profile 1022.

Next, the sequence determining section 1015 establishes the sequence of movement for the remaining platforms. Specifically, a comparison is made with regard to the reliability b for each platform, 1 point being given in the case in which the reliability is high and, with regard to persistency c, a comparison between platforms is made, and 1 point is given in the case in which continued existence is possible at a platform. In the same manner with regard to the provided resources g, a comparison of platforms is made, and 1 point is given for richness of resources and, with regard to the platform schedule j, a comparison is made between platforms, and 1 point is given for the longest duration. Then, the sequence of movement is established, starting from the platform that has the highest number of points continuing in sequence of descending score.

(2-9. Referencing Judgment)

When making the above-described judgments, selections, and decisions, the referencing judgment section 1023 makes a judgment as to how information such as the platform profile 1021 and the agent profile 1022 (known as profile information) is to be referenced. Typical examples of how referencing is done are the cases in which the an agent references itself to check the information, in which a request is made with respect to another agent of a platform for referencing, and in which, upon receiving a referencing request, profile information is referenced anew or already known information is used. There is freedom, however, in deciding the actual method used.

For example, in such case as a case in which it is not possible for a given agent to check the status of a platform by itself, that is, in the case in which the agent load is high, a case in which the agent does not have the access permission for referencing the platform profile 1021, and a case in which the communication status with respect to a target platform are poor, it is necessary to make a request of another agent.

For example, in the case in which the agent A1 at the platform F1 attempts to check the provided resource list g or the like from the platform profile 1021 of another platform, platform F2, the following judgment is made, using the referencing judgment section 1023. Specifically, the referencing judgment section 1023 of the agent A1 first retrieves the platform profile 1021 at the current platform F1, so as to check the using status of resources (load) at the current location, platform F1. With regard to this item, it is also possible to issue an inquiry to the platform F1, thereby having platform F1 retrieve its own platform profile 1021, the results being returned to the agent A1.

As a result of the above, if the platform F1 load is determined to be high, the referencing judgment section 1023 selects the issuance of a request to another agent, for example, for referencing of the platform profile 1023 of the target platform. As a result, the agent A1 makes a request of the agent A2 at the target platform F2 to retrieve the platform profile 1021 of the platform F2. If, however, the reliability of the platform F1 is low, the referencing judgment section 1023 selects the approach of checking the platform profile 1021 by directly referencing it by itself. As a result of this, the agent A1 itself retrieves the platform profile 1021 of the platform F2.

An agent that has received a request from another platform to check profile information, either responds to the request, based on information known to it at present, from the current load at the local platform and network status, and status at the platform being checked, this being information that has already been determined and recorded in its own memory area, or re-performs a check of the profile information anew, the selection of the method of response being made dynamically.

At an agent that has received a request to check profile information from another platform, the referencing judgment section 1023 makes a selection of either responding by newly accessing the requested information by referencing the provided resource list g, for example, of the platform profile 1021, or responding based on already-known information, as noted above. For example, in the above example, when the agent A2 at the platform F2 is requested to check the platform profile 1021 of the platform F2, the referencing judgment section 1023 retrieves the platform profile 1021 of the platform 12, thereby checking the resource use status (load) at the platform F2 at which it is currently located. With regard to this item, it is also possible to issue an inquiry for this information to the platform F2, thereby having the platform F2 check its own platform profile 1021, the result being returned to the agent A2.

As a result of the above check of information, if the load on the platform F2 is discovered to by high, the referencing judgment section 1023 selects reliance on already-known information. As a result of this, the agent A2 at platform F2, which had received the request, responds to the agent A1 at the platform F1, based on the information it currently knows. If, however, the load at the platform F2 is discovered to be low, the referencing judgment section 1023 selects the approach of checking the requested information anew. As a result, the agent A2 that had received the request to check information retrieves the latest information from the platform profile 1021 of the platform F2, and responds to the requesting agent A1, based on this information.

(2-10. Instructing Means)

The above is a description of the case in which it is necessary for an agent, when executing a plan, to make a request for processing to another platform. However, even a case in which a judgment is made by an agent that the agent itself must move to another platform, the allocation section 1009 monitors whether or not it is necessary for a platform to move an agent located at it to another platform, and also whether or not it is necessary to move an agent from another platform to itself, a judgment being made on this monitoring and, if such a move is judged to be necessary, an instruction is issued to the agent in accordance with the judgment.

More specifically, a platform, in response to its own status and the status of other related platforms, must dynamically allocate the agents that operate at these platforms. The above-noted "related platforms" are, for example, platforms which have all or part of their platform profile in common with the local platform.

For example, in a case in which the load on the local platform is extremely high, or in which there is a need for a function that an agent itself does not have, it can be envisioned that this allocation section 1009 checks whether or not another platform has a corresponding function and, based on the result of that check, issues an instruction to the agent to move to another platform. It can further be envisioned that, in the case in which the load on another platform is high, for example, the allocation section 1009 issues an instruction to move an agent from that platform to its own platform.

That is, the allocation section 1009 of a platform, makes a judgment as to whether or not to issue an instruction for agent movement, based on such information as the mobility support a, reliability b, persistency c, permission list d, platform language list e, provided resources g, and agent list h of the platform profile 1021, and the mobility possibility k, agent mobility support, required resource list m, agent language version o, and required service list p of the agent profile 1022. When referencing this type of profile information as well, similar to the case described above, the referencing judgment section 1023 makes a judgment as to the method of referencing the profile information.

For example, at an arbitrary timing the platform F1 retrieves its own platform profile 1021 and the platform profile 1021 of another platform, and checks with regard to both the platforms the mobility support a, which is whether the platform supports a mobile agent, and the provided resource list g, which is the type and quantity of resources provided by the platform.

As a result of the above-noted check, in the case in which not only do both platforms support a mobile agent, but also the local platform is discovered to have a smaller load than the other platform, a further retrieval is made of the platform profile 1021 of the other platform, so as to check the agent list h of the platform, which indicates the agents that exist at that platform.

Next, by retrieving the agent profile 1022 of the agents that exist at the other platform, a check is made of the mobility k, which indicates for each of the agents at other platform, whether or not the agent can move. As a result, if an agent that can move was included in the list, the agent profile 1022 of that agent is retrieved so as to check the required resource list m, the agent language version o, and the required service list p thereof.

Next, by retrieving the platform profile 1021 of the local platform, a check is made of the permission list d, the provided resource list g, the platform language list e, and the provided service list i thereof.

As a result, in the case in which not only the agent of which the profile information was just checked has permission for execution at the local platform as well but also all the resources, services, languages, and versions required by the agent can be provided, the allocation section 1009 makes a judgment that the agent should be caused to move to the local platform, an instruction to that effect being given to the agent via the communication section 1008.

In the case in which the load at the other platform is smaller than at the local platform, the allocation section 1009 further retrieves the platform profile 1021 of the local platform, so as to check the agent list h. Next, with regard to agents that are included in this agent list, these being agents located at the local platform, a check is made of the mobility k, by retrieving the agent profile 1022.

As a result of the above-noted checks, in the case in which there is a mobile agent among the agents existing at the local platform, the allocation section 1009 retrieves the agent profile 1022 of that agent, so as to check the required resource list m, the agent language version o, and the required service list p of the agent. Additionally, by retrieving the platform profile 1021 of the other platform, the allocation section 1009 checks the permission list d, the provided resource list g, the platform language list e, and the provided service list i thereof.

As a result of the above checks, in the case in which an agent which not only the agent of which the profile information was checked as permission for execution at the other platform, but also all the resources, services, languages, and versions required by the agent can be provided, the allocation section 1009 makes a judgment that the agent at the local platform should be caused to move to the other platform, an instruction to that effect being given to the agent via the communication section 1008.

(2-11. Details of Agent Movement)

In the processing described above, when an agent is to be moved to another platform, the agent is moved to the other platform by using the movement section 1006 of the platform at which the agent exists (step 1037). There are two types of movement, these being normal movement and clone movement, the agent A1 moving by the selected means of movement.

Specifically, in normal movement the agent is deleted from the original (current) platform, for example by the following type of procedure.

Send movement request to the movement destination platform.

Receive response from the movement destination platform.

Send agent information to the movement destination platform.

Receive movement pass/fail notification from the movement destination platform.

Start execution at the movement destination platform.

Cancel registration of the agent at the current platform.

Delete the agent from the current platform.

In clone movement, rather than reproducing (cloning) the agent at the movement destination, the agent that forms the original at the current platform does not get deleted, and continues to operate, so that there is an increase in the total number of agents in the system. This type of clone movement is used in a case in which parallel processing in a plurality of systems is to be done, based on a plurality of differing knowledges and plans.

The clone movement procedure is formed by removing the steps of canceling the registration and deleting the agent at the current platform from the above-noted procedure for normal movement, and is performed, for example, as follows.

Send movement request to the movement destination platform.

Receive response from the movement destination platform.

Send an agent code to the movement destination platform.

Receive movement pass/fail notification from the movement destination platform.

Start execution at the movement destination platform.

Of the above procedures, the normal movement procedure, similar to the movement of an agent in an agent system according to the earlier described first embodiment, is performed according to the procedure that is shown in FIG. 17.

(2-12. Contract Net Protocol Procedure)

In the above-described procedures, in the case in which an agent is to cooperate with an agent at another platform, according to this embodiment each of the agents uses the cooperation section 1007 section of the platform at which it itself is located to perform cooperation by the so-called contract net protocol (step 1038). Because this contract net protocol procedure, similar to the case of the first embodiment, is performed according to the procedure that is shown in FIG. 16, a description of this procedure will not be presented here. The contract net protocol, which makes task request between agents, is performed between the cooperation sections 1007 of the platforms at which the agents are located, via the communication section 1008.

3. Effect

As described above, in the case in which an agent that is operating at a given platform requires processing at another platform, with this embodiment of the present invention either the agent is moved to the other platform or the agent is kept at the current platform, with processing being done at the other platform via message communication with an agent at the other platform, this latter approach representing cooperation, the decision of which to approach to take being made by the movement/cooperation judgment section 1011. As a result, even in cases in which there is a difference in whether an agent or a platform supports movement, or in which the reliability of the communication circuit between the platform depends upon the combination of platforms, it is possible to perform smooth processing at the other platform.

Additionally, according to this embodiment the procedure for an agent moving to another platform, that is, the processing whereby an agent plan and internal status information is transferred to, and an agent process is established at, another platform, the establishment of whether it is the agent or the platform that is to mainly perform management of this processing is made by the manager judgment section 1012. For this reason, there is an increase in the degree of freedom in moving an agent, thereby enabling smooth and efficient movement of an agent, in response to the system situation and configuration.

According to this embodiment of the present invention, when an agent is moved to another platform, because the timing judgment section 1013 makes a decision as to whether to move immediately or after waiting for some time, in response to such factors as the platform situation and status of a communication circuit used to perform movement, diversity of timing of agent movement is achieved, thereby reliably improving the efficiency of agent movement.

According to this embodiment of the present invention, when there is a plurality of movement destination platform candidates, because the movement destination selection section 1014 selects the most suitable platform as the movement destination, processing is performed smoothly and with good efficiency. According to this embodiment, when an agent is to be sequentially moved to a number of platforms, because the sequence determining section 1015 establishes the optimal sequence, based on the load of each platform and on such factors as the status of the communication circuit to each platform, there is an improvement in efficiency for each agent and each platform, as well as for the overall system.

According to this embodiment, an instruction for movement between platforms is given by the allocation section 1009 in response to the status at each of the platforms, the result being a dynamic allocation of agents to each of the platforms, and an improvement in the overall system processing efficiency.

According to this embodiment, information with regard to whether each of the platforms supports the movement of an agent, and with regard to the reliability of the network circuit connected to each of the platforms is prepared beforehand in the platform profile 1021, the result being that, when a judgment is made with regard to movement, it is possible to easily obtain such information without having to directly access a platform or a name server, for example, thereby improving the efficiency of the judgment with regard to movement.

According to this embodiment in particular, because not only information with regard to whether agent movement is supported, but also various items such as resources and services provided by a platform and permission with regard to each action can be stored in the platform profile 1021, by referencing this platform profile 1021, it is possible to easily perform a detailed judgment with regard to movement.

Additionally, according to this embodiment, information with regard to whether each agent supports movement between platforms, and with regard to what resources and services are required by each agent is stored beforehand in the agent profile 1022, the result being that, when a judgment with regard to movement is made, it is possible to easily obtain such information, without the need to reference and check the internal agent status and generation histories, thereby improving the efficiency of judgments with regard to movement.

With this embodiment in particular, because it is possible to store into the agent profile 1022 beforehand not only whether an agent can move between platforms, but various items such as what language and version thereof the actions of an agent are described, and what resources, services, and permissions are required by the agent, by referencing this agent profile 1022, it is possible to easily perform detailed judgments with regard to movement.

Additionally, because in this embodiment when a judgment is performed with regard to how the referencing of platform profile and agent profile information is to be done is made by the referencing judgment section 1023, it is possible to select the most efficient method of referencing, in response to the type of hardware at which these profiles reside.

4. Variations

Variations of the above-noted embodiment include other examples shown below.

The aforementioned embodiment shows that the sequence of steps is judgment of whether movement or cooperation is to be done, judgment with regard to the main manager of processing, judgment with regard to timing, selection of the movement destination, and finally establishment of the movement sequence. The sequence of these steps, however, is merely an example. It should be noted that it is possible to change the sequence of these steps to some degree. For example, it is possible to perform the judgment with regard to the main manager of processing after the judgment of timing, and to establish the main manager and timing for each of the movement destinations after establishing the movement destinations and movement sequence. Although in FIG. 23, which shows the above-noted embodiment, the movement section 1006 is not included within the agent but as constituent element of the platform, it is possible to provide the movement section 1006 within the agent.

It is possible to freely establish the specific criterion to be used in establishing the waiting time when an agent is not to be moved to another platform immediately. Similarly, it is possible to freely establish the specific criterion to be used in establishing the movement destination and movement sequence when there is a plurality of candidates. It is also possible to freely select what specific items are to be stored in the platform profile and the agent profile.

3. Other Embodiments

The present invention is not limited to the above-noted embodiments, and those skilled in the art would provide various other embodiments according to the present invention. For example, in the present invention, free selection can be made with regard to the size and type of network, and the number of platforms. Similarly, free selection can be made with regard to the type of information processing to be done by using agents, and the specific language to be used in describing actions, knowledge, plans or the like, and information contents that are used in the information processing. While the above-noted embodiments were described mainly using the example of an agent that performs planning, the present invention can also be applied to an agent that does not perform planning.

4. Effect of the Invention

As described in detail above, according to the present invention, by establishing whether to move between nodes or cooperate with another agent, so as to generate an action plan for agents in accordance with conditions and implement processing at another node, it is possible to perform information processing with good efficiency, in response to changes in situations.

What is claimed is:

1. A platform which performs information processing in a network that has a plurality of platforms including the platform, the platform comprising:

a movement section configured to cause an agent to move between platforms;

a cooperation section configured to cause cooperation to be performed between a plurality of agents;

a storage section configured to store at least one of a platform profile which represents information that is used as a basis for a judgment with regard to agent movement for each platform and that includes information with regard to whether each of the platforms can accept a transferred agent and support the operation of the agent, and an agent profile which represents information that is used as a basis for a judgment with regard to movement for each agent and that includes information with regard to whether each of the agents has the ability to move between platforms; and a decision section configured to make a decision, when an agent currently located at a platform needs to make use of another platform, whether to cause the agent to move to the other platform or cause the agent to cooperate with another agent that exists at the other platform, based on at least one of said platform profile and said agent profile.

2. The platform according to claim 1, wherein said platform profile, for each platform, represents information that includes at least one item selected from a group consisting of:

a) whether there is a function to cause agent movement;
b) whether the reliability of a network circuit related to the platform is high or low;
c) whether it is possible to have an agent exist indefinitely;
d) what types of actions are recognized for an agent;
e) what types of programming languages can be executed;
f) whether the platform will mainly manage processing for agent movement;
g) what types and quantities of resources are to be provided;
h) what types of agents exist;
i) what services are to be provided; and,
j) from when until when is action to be done.

3. The platform according to claim 1, wherein said agent profile, for each agent, represents information that includes at least one item selected from a group consisting of:

k) whether the agent has the ability to move between platforms;
l) whether processing for agent movement is to be done mainly by the agent;
m) what types and quantities of resources are required by the agent;
n) from when until when is action to be done;
o) in what programming language the agent action is to be described; and
p) what types of services are required by the agent.

4. The platform according to claim 1, further comprising:
a planning section configured to generate an agent plan that satisfies a given request;
an execution section configured to cause an agent to act by causing the agent to execute the generated agent plan;
an agent information storage section configured to store information required for agent action;
an agent management section configured to cause an agent at a platform either to move to another platform or to cooperate with another agent at another platform;
a knowledge storage section configured to store knowledge required for generation of said agent plan, said movement, and said cooperation; and
a knowledge management section configured to manage said knowledge storage section.

5. The platform according to claim 1, further comprising:
an exception handling section configured to handle an exception that occurs when an agent is to be moved between platforms, wherein said exception handling section comprises:
an exception description section configured to store exception descriptions representing what type of handling is to be done for what type of exception; and
a handling section configured to handle an exceptional operation, based on said exception description.

6. The platform according to claim 5, wherein said exception description represents what type of handling is to be done for at least one exception selected from a group consisting of:

(1) an exception that an agent cannot be moved occurs because communication with a platform that has been specified as the movement destination has failed;
(2) an exception that an agent cannot be moved because the movement destination specification is invalid;
(3) an exception that an agent cannot be moved because the platform specified as the movement destination does not have a section configured to accept the agent and causing the agent to act; and
(4) an exception that an agent cannot be moved because of insufficient resources at the platform specified as the movement destination.

7. The platform according to claim 5, wherein said exception description includes:
information with regard to which of a plurality of communication circuits have a low reliability; and
information that represents what type of handling is to be done with respect to an exception that can occur when an agent is moved between platforms through a low-reliability communication circuit.

8. The platform according to claim 1, said decision section further comprising a section configured to make a judgment as to whether a procedure for moving an agent is to be managed mainly by the agent, or is to be managed mainly by a platform.

9. The platform according to claim 1, said decision section further comprising a section configured to make a judgment as to whether to move an agent immediately when the agent is to be moved to another platform.

10. The platform according to claim 1, said decision section further comprising a section, when there exist a plurality of platform candidates for the movement destination, configured to select a platform from said plurality of candidates to which the movement is made.

11. The platform according to claim 1, said decision section further comprising a section, when an agent is to be moved to a plurality of platforms in sequence, configured to determine the sequence of the platforms to which the agent is to be moved.

12. The platform according to claim 1, wherein said platform includes;
a section configured to make a judgment as to whether to cause an agent at the platform to move to another platform or to cause another agent at the other platform to move to the platform; and
a section configured to indicate a result of the judgement to the agent to be moved.

13. An information processing method for performing information processing by causing an agent to act in a network that has a plurality of platforms, said method comprising
making a decision, when an agent currently located at a platform needs to make use of another platform, whether to cause the agent to move to the other platform or cause the agent to cooperate with another agent that exists at the other platform, based on at least one of a platform profile and an agent profile;
causing the agent to move to the other platform when such a decision has been made;
causing the agent to cooperate with the other agent that exists at the other platform when such a decision has been made; and providing at least one of platform profile which represents information that is used as a basis for a judgment with regard to agent movement for each platform and that includes information with regard to whether each of the platforms can accept a transferred agent and support the operation of the agent, and an agent profile which represents information that is used as a basis for a judgment with regard to movement for each agent and that includes information with regard to whether each of the agents has the ability to move between platforms.

14. The information processing method according to claim 13, further comprising:

generating an agent plan that satisfies a given request;

causing an agent to act by causing the agent to execute a generated plan;

storing and reading out information required for action of an agent;

causing an agent at a platform either to move to another platform or to cooperate with another agent at another platform;

storing and reading out knowledge required for generation of said agent plan, said movement, and said cooperation; and managing said storing and reading of said knowledge.

15. The information processing method according to claim 13, further comprising making a judgment as to whether a procedure for moving an agent is to be managed mainly by the agent, or is to be managed mainly by a platform.

16. The information processing method according to claim 13, further comprising making a judgment as to whether to move an agent immediately when the agent is to be moved to another platform.

17. The information processing method according to claim 13, further comprising:

making a judgment by a platform as to whether to cause an agent at the platform to move to another platform or to cause another agent at the other platform to move to the platform; and indicating by the platform a result of the judgment to the agent to be moved.

18. Computer-readable storage medium storing a program for performing information processing by causing an agent to act in a network that has a plurality of platforms, said program further comprising:

means for causing a computer to make a decision, when an agent currently located at a platform needs to make use of another platform, whether to cause the agent to move to the other platform or cause the agent to cooperate with another agent that exists at the other platform, based on at least one of a platform profile and an agent profile;

means for causing a computer to cause the agent to move to the other platform when such a decision has been made;

means for causing a computer to cause the agent to cooperate with the other agent that exists at the other platform when such a decision has been made; and means for causing a computer to manage at least one of platform profile which represents information that is used as a basis for a judgment with regard to agent movement for each platform and that includes information with regard to whether each of the platforms can accept a transferred agent and support the operation of the agent, and an agent profile which represents information that is used as a basis for a judgment with regard to movement for each agent and that includes information with regard to whether each of the agents has the ability to move between platforms.

19. The computer-readable storage medium according to claim 18, said program further comprising means for causing a computer to make a judgement as to whether a procedure for moving an agent is to be managed mainly by the agent, or is to be managed mainly by a platform.

\* \* \* \* \*